United States Patent
Greenstein et al.

(10) Patent No.: US 12,429,439 B1
(45) Date of Patent: *Sep. 30, 2025

(54) JET BLADES OPTICAL INSPECTION

(71) Applicant: Aerospace Industrial Scan Ltd., Modi'in Maccabim-Reut (IL)

(72) Inventors: Lior Greenstein, Tel Aviv (IL); Gilad A. Davara, Rehovot (IL); Roni Tzubery, Modi'in (IL); Jacob Bortman, Rehovot (IL); Vadim Leiderman, Modi'in (IL); Alon Modan Dumanis, Modi'in Maccabim-Reut (IL)

(73) Assignee: AEROSPACE INDUSTRIAL SCAN LTD., Modi'in Maccabim-Reut (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,424

(22) Filed: Feb. 19, 2025

Related U.S. Application Data

(63) Continuation of application No. 18/911,557, filed on Oct. 10, 2024, now Pat. No. 12,253,481.

(51) Int. Cl.
*G01N 23/04* (2018.01)
*G01N 23/083* (2018.01)
*G01N 23/18* (2018.01)

(52) U.S. Cl.
CPC ............. *G01N 23/18* (2013.01); *G01N 23/04* (2013.01); *G01N 23/083* (2013.01); *G01N 2223/3306* (2013.01); *G01N 2223/505* (2013.01)

(58) Field of Classification Search
CPC ...... G01N 23/18; G01N 23/04; G01N 23/083; G01N 2223/3306; G01N 2223/505
See application file for complete search history.

(56) References Cited

U.S. PATENT DOCUMENTS

| 4,802,195 | A | 1/1989 | Wojcienchowski et al. |
| 4,803,639 | A | 2/1989 | Steele et al. |
| 12,253,481 | B1 * | 3/2025 | Greenstein ........... G01N 23/083 |

* cited by examiner

*Primary Examiner* — Courtney D Thomas
(74) *Attorney, Agent, or Firm* — PEARL COHEN ZEDEK LATZER BARATZ LLP

(57) ABSTRACT

A system for inspecting a jet blade including: a jet blade support assembly including: a sub-frame, a gripper support rotatably coupled to the sub-frame and being tiltable about a tilting axis, and a light transmissive jet blade gripper to hold a root of the jet blade, the jet blade gripper being removably couplable to the gripper support and rotatable with respect to the gripper support about a gripper rotation axis; a first illumination device to illuminate at least the root of the jet blade at least partially through the jet blade gripper; a second illumination device to illuminate at least a portion of the jet blade, the first illumination device and the second illumination device to illuminate respective portions of the jet blade from different directions; and an optical acquisition sub-system comprising an imaging sensor to capture images from a direction that is parallel to the second illumination direction.

20 Claims, 16 Drawing Sheets

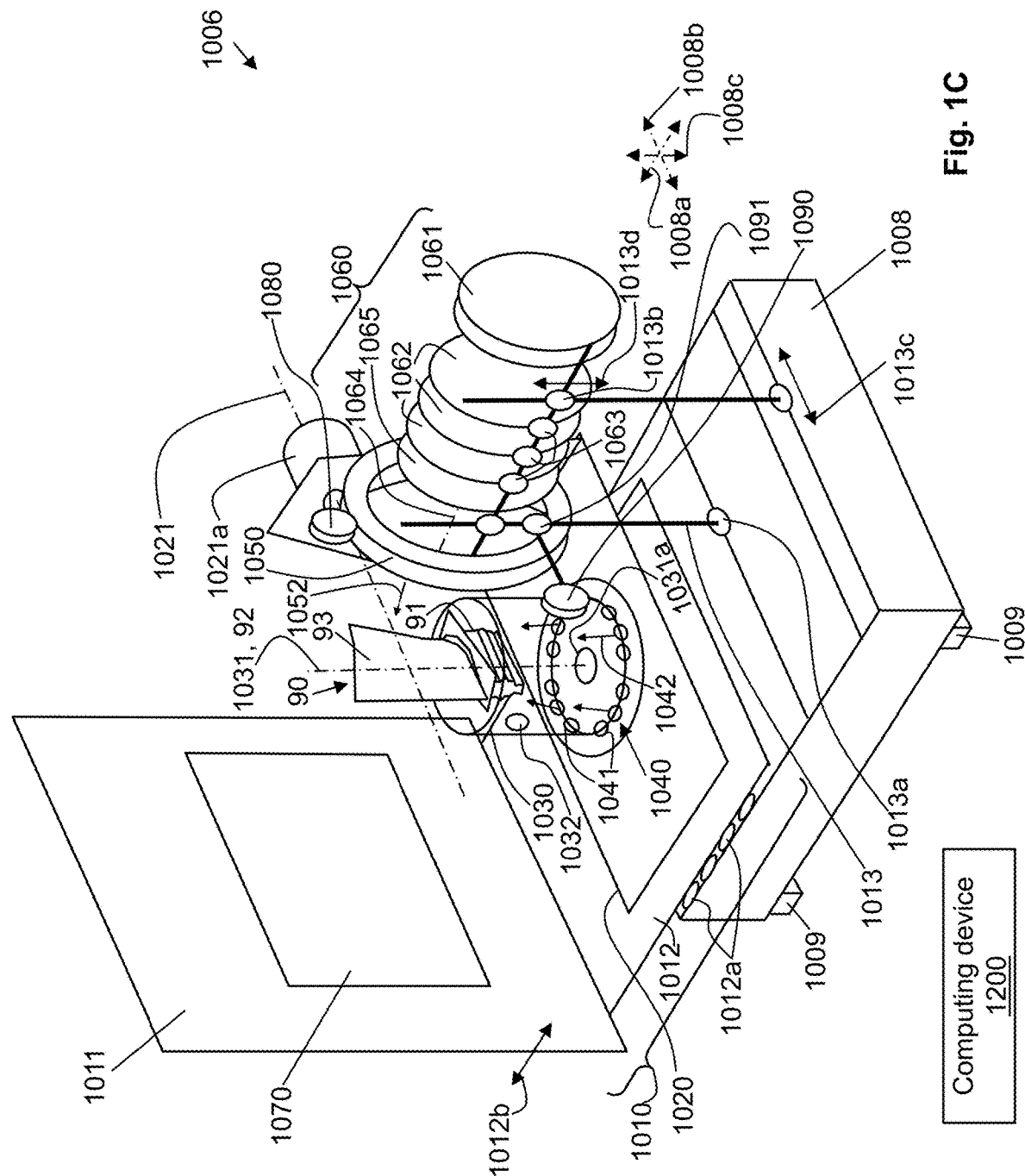

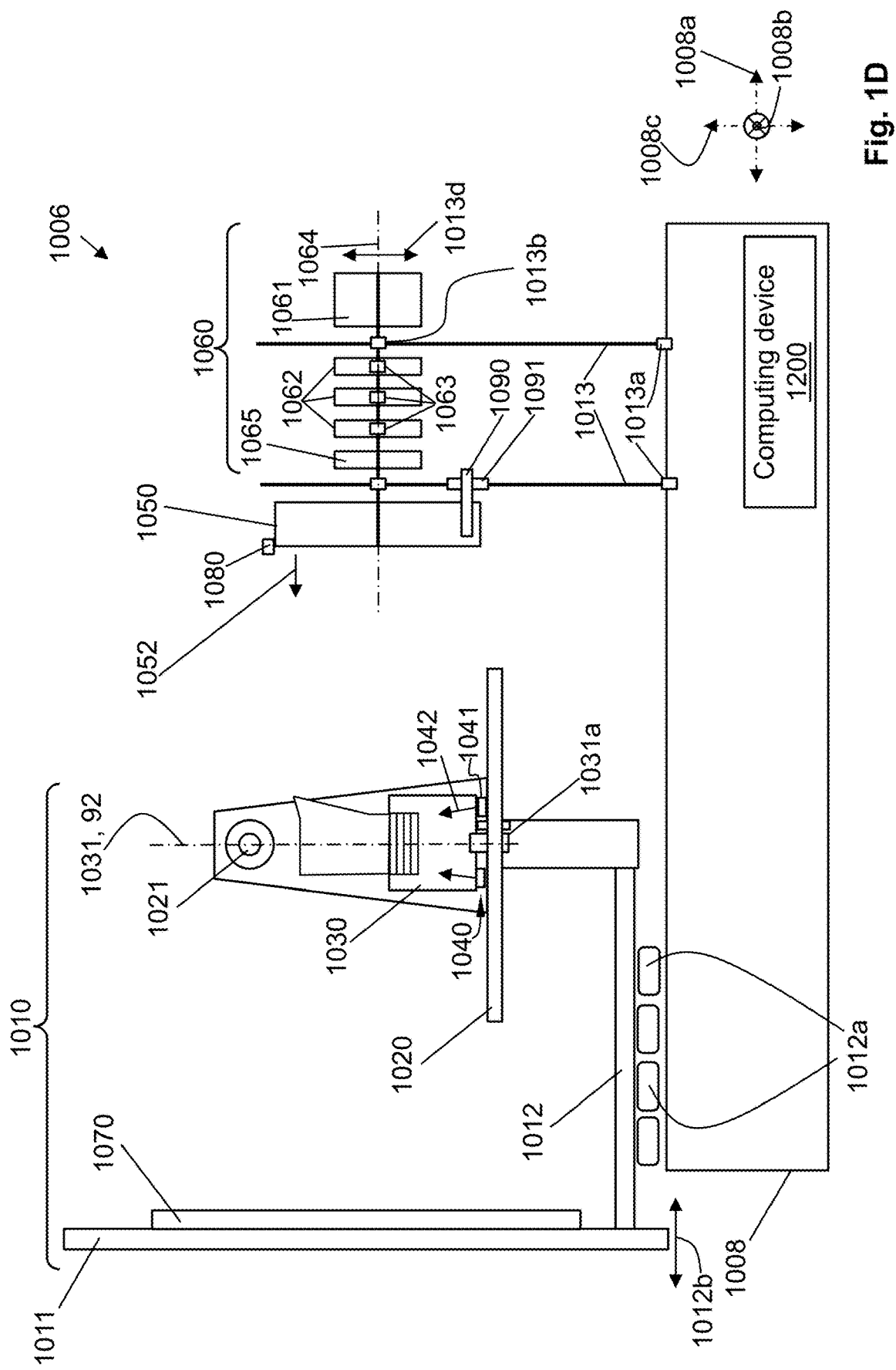

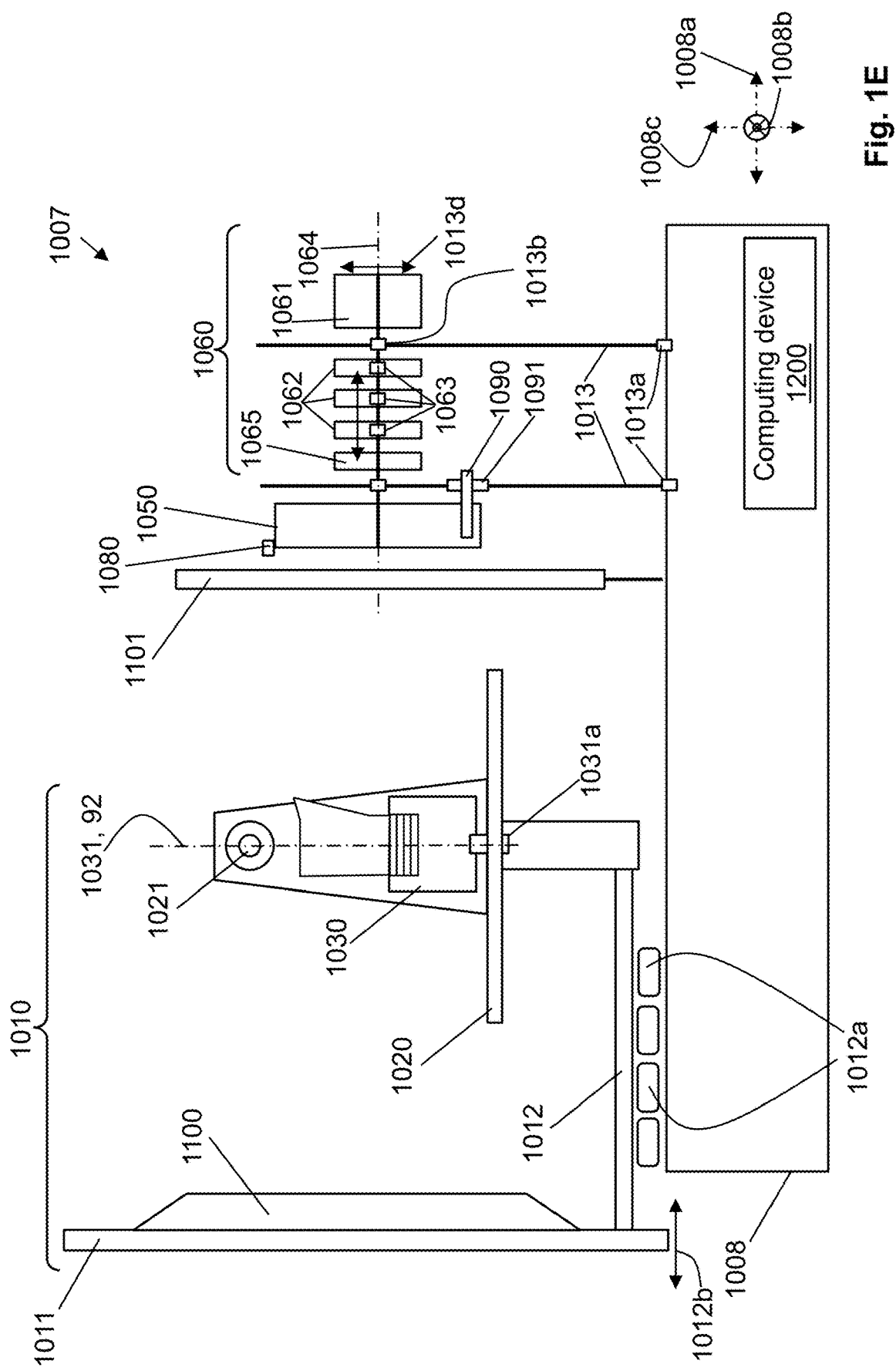

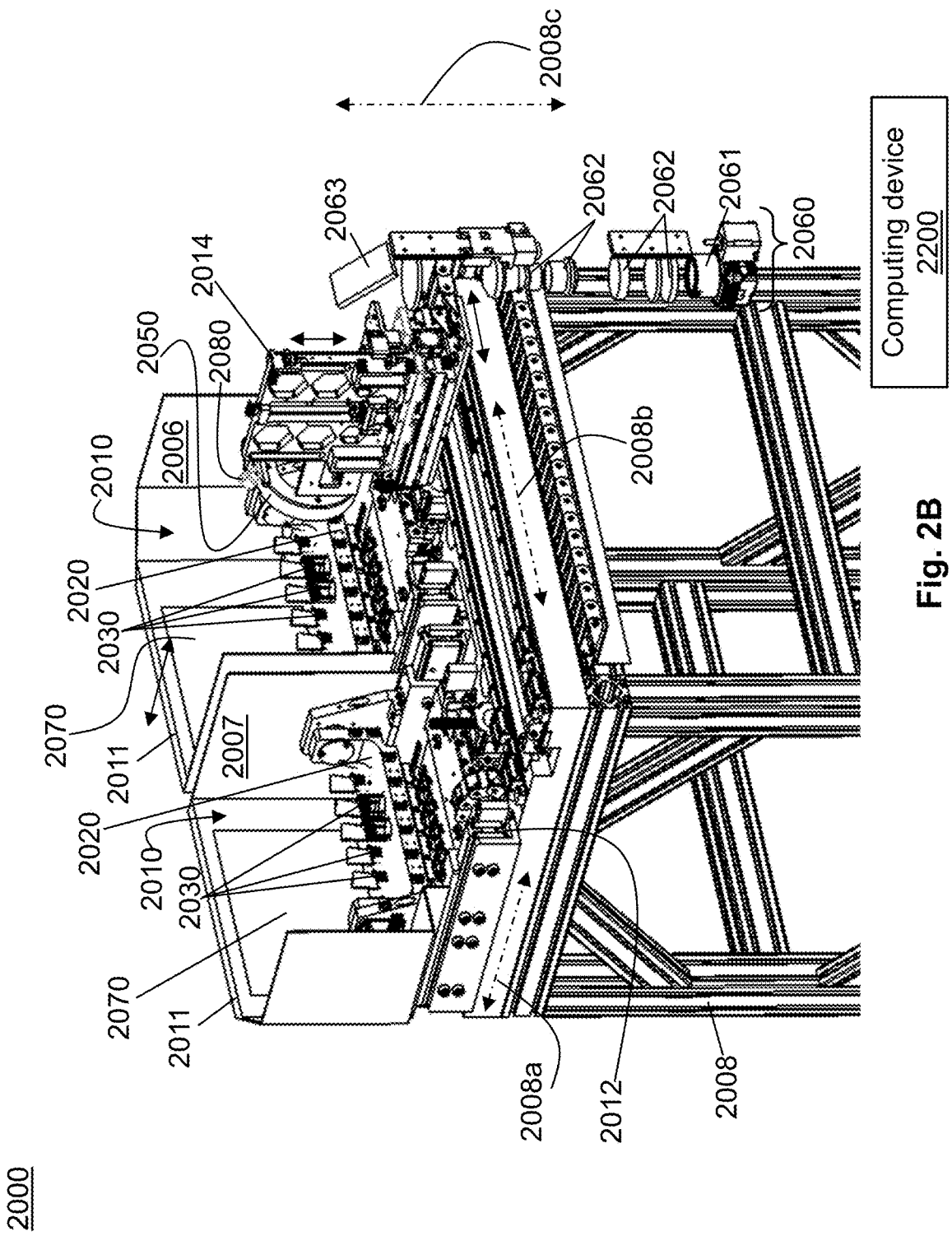

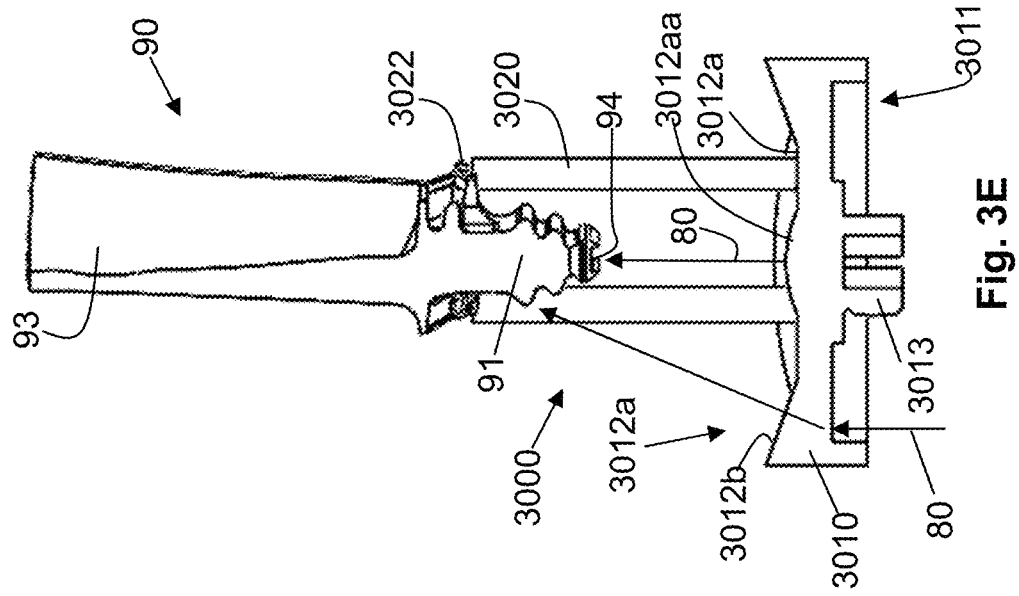
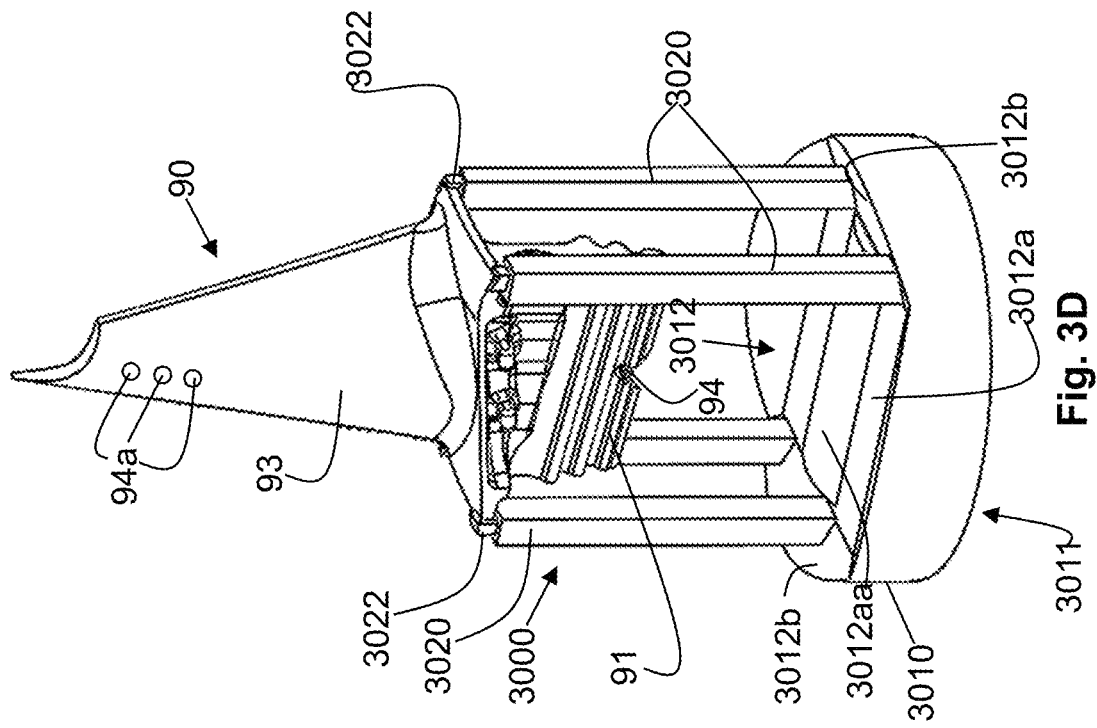

JET BLADES OPTICAL INSPECTION

CROSS-REFERENCE TO RELATED APPLICATIONS

This application is a continuation of U.S. patent application Ser. No. 18/911,557 filed Oct. 10, 2024, which is hereby incorporated by reference.

FIELD OF THE INVENTION

The present invention relates to the field of non-destructive testing, inspection, examination and evaluation of jet blades, and more particularly to devices, systems and methods for optical non-destructive testing, inspection, examination and evaluation of jet blades jet blades. The present invention also relates to the field of detection of defects and measurements of jet blades, and more particularly to devices, systems and methods for detection of defects and measurements of jet blades. The present invention also relates to the field of removal of defects, marking and identification of jet blades, and more particularly to devices, systems and methods for removal of defects, marking and identification of jet blades.

BACKGROUND OF THE INVENTION

Jet blades, such as aeroengine jet blades, may be exposed to extreme environmental and operating conditions such as high temperatures, high dynamic pressure, erosion and/or corrosion. Defected jet blades may cause severe damage to engines operating those jet blades. Accordingly, high quality inspection during manufacturing and/or maintenance of jet blades is important.

Typically, the inspection of jet blades (e.g., during the manufacturing and/or the maintenance of the jet blades) includes a visual examination by a technician. During the inspection, the technician typically holds and rotates the jet blade to inspect the jet blade from different directions, sometimes using a magnifying glass. Typically, the technician has little or no control over illumination parameters (e.g., illumination power and/or illumination wavelengths) and/or proper magnification of various parts of the jet blade. Such visual examination is subjective and depends on the technician's skills and/or experience.

SUMMARY OF THE INVENTION

Some embodiments of the present invention may provide a system for inspecting a jet blade, the system may include: a jet blade support assembly including: a sub-frame, a gripper support rotatably coupled to the sub-frame, the gripper support being tiltable about a tilting axis, and a jet blade gripper to hold a root of the jet blade, the jet blade gripper being formed from a material that is at least partially transmissive to light, the jet blade gripper being removably couplable to the gripper support and rotatable with respect to the gripper support about a gripper rotation axis that is perpendicular to the tilting axis; a first illumination device to illuminate at least the root of the jet blade at least partially through the jet blade gripper; a second illumination device to illuminate at least a portion of the jet blade, the first illumination device and the second illumination device to illuminate respective portions of the jet blade from different directions; and an optical acquisition sub-system including an imaging sensor to capture images.

In some embodiments, the system includes a computing device to control: tilting of the gripper support between a plurality of tilting positions, rotation of the jet blade gripper with respect to the gripper support between a plurality of angular positions, illumination parameters of the first illumination device, illumination parameters of the second illumination device, such that the imaging sensor to capture, for each of at least a portion of the tilting positions of the gripper support and at least a portion of the angular positions of the jet blade gripper, one or more images of the jet blade to provide a plurality of images of the jet blade, the plurality of images representing a surface of the jet blade from different directions and under different illumination conditions.

In some embodiments, the computing device to control the tilting, the rotation and the illumination parameters based on at least one of geometric parameters of the jet blade, an inspection protocol and at least a portion of the plurality of images of the jet blade.

In some embodiments, the first illumination device is coupled to the gripper support and disposed between the gripper support and the jet blade gripper when the jet blade gripper is coupled to the gripper support.

In some embodiments, the first illumination device includes a plurality of light emitting elements coupled to the gripper support and arranged along a curve corresponding to a perimeter of a bottom surface of the jet blade gripper, each light emitting element of the plurality of light emitting elements being operable independent of other light emitting elements of the plurality of light emitting elements.

In some embodiments, the second illumination device is coupled to the optical acquisition sub-system, the second illumination device including a plurality of light emitting elements arranged in a ring, the second illumination device being coaxial with an optical axis of the optical acquisition sub-system.

In some embodiments, the optical acquisition sub-system includes a plurality of optical elements to deliver light reflected from the jet blade to the imaging sensor, wherein parameters of at least a portion of the optical elements are adjustable to achieve desired image parameters for the images acquired by the optical acquisition sub-system.

In some embodiments, the optical acquisition sub-system includes a plurality of piezoelectric lenses, wherein a voltage applied on at least a portion of the piezoelectric lenses is adjustable to achieve desired image parameters for the images acquired by acquisition sub-system.

In some embodiments, the optical acquisition sub-system includes a plurality of movable lenses, wherein at least a portion of the movable lenses are movable with respect to each other and with respect to the imaging sensor to achieve desired image parameters for the images acquired by acquisition sub-system.

In some embodiments, the optical acquisition sub-system is movable with respect to the jet blade support assembly in at least one of: directions that are parallel to the tilting axis, directions that are parallel to the gripper rotation axis, and directions that are perpendicular to the tilting axis and the gripper rotation axis.

In some embodiments, the jet blade support assembly is movable with respect to the optical acquisition sub-system in directions that are perpendicular to the tilting axis and the gripper rotation axis.

In some embodiments, the system includes a third illumination device positioned such that the jet blade support assembly is disposed between the third illumination device and an aperture of the optical acquisition sub-system, wherein the third illumination device to emit light in a direction that is parallel to the second illumination direction.

In some embodiments, the system includes: a compartment including: an x-ray source; a scintillator; and a second jet blade support assembly disposed between x-ray source and the scintillator; wherein the optical acquisition sub-system is movable into the compartment to position an aperture of the optical acquisition sub-system in front of the scintillator.

In some embodiments, the system includes an ablation unit to ablate residual material projecting from the surface of the jet blade.

In some embodiments, the system includes a cleaner to apply air on the surface of the jet blade to clean the surface of the jet blade.

In some embodiments, the system includes a weight sensor coupled to the gripper support, the weight sensor to measure a weight of the jet blade gripper and the jet blade affixed therein when the jet blade gripper is coupled to the gripper support.

In some embodiments, the jet blade gripper includes: a base member, and a plurality of elongated members projecting from a top surface of the base member, each of the elongated members includes a latch to hold the root of the jet blade.

In some embodiments, the top surface of the base member includes: a central portion, and a sloped portion surrounding the central portion, the sloped portion converging from an edge of the top surface towards the central portion.

In some embodiments, the system includes a computing device to determine an existence or absence of a defect in the jet blade based on at least one of the images of the jet blade.

In some embodiments, the system includes a housing, the housing including a compartment to accommodate the jet blade gripper support, the first illumination device, the second illumination device and the optical acquisition sub-system, the housing being lightproof to prevent light from entering and escaping the compartment when a door of the compartment is closed.

Some embodiments of the present invention may provide a system for inspecting a jet blade, the system may include: a housing including: a frame; a compartment, the compartment including a jet blade support assembly coupled to the frame, the jet blade support assembly to hold the jet blade; and an optical acquisition sub-system including: a sub-frame coupled to the frame, the sub-frame being movable with respect to the frame; a plurality of movable lenses coupled to the sub-frame, and an imaging sensor coupled to the sub-frame; and a controller to, based on at least one of geometric parameters of the jet blade and one or more images of the jet blade acquired by the imaging sensor: control relative position of the plurality of movable lenses with respect to each other, and control relative position of the sub-frame and the optical acquisition sub-system relative to the jet blade support assembly.

In some embodiments, the controller is part of the optical acquisition sub-system.

In some embodiments, the sub-frame of the optical acquisition sub-system is movable with respect to the frame along at least one of: a first axis to adjust a distance between the optical acquisition sub-system and the jet blade support assembly, a second axis that is perpendicular to the first axis and parallel to a longitudinal axis of the jet blade, and a third axis that is perpendicular to the first axis and the second axis.

In some embodiments, the system includes a second compartment, the second compartment including a jet blade support assembly coupled to the frame, and wherein the sub-frame and the optical acquisition sub-system is movable relative to the frame between the compartment and the second compartment.

BRIEF DESCRIPTION OF THE DRAWINGS

For a better understanding of embodiments of the invention and to show how the same can be carried into effect, reference is made, purely by way of example, to the accompanying drawings in which like numerals designate corresponding elements or sections throughout. In the accompanying drawings:

FIGS. 1C and 1D, are schematic illustrations of components of the system for optical inspection of the jet blade, according to some embodiments of the invention;

FIG. 1E is a schematic illustration of components of the system for x-ray inspection of the jet blade, according to some embodiments of the invention;

FIGS. 2B and 2C are 3D diagrams of components of the system, according to some embodiments of the invention;

FIG. 3D is a 3D diagram of the jet blade gripper holding the jet blade, wherein the jet blade may include one or more ducts, according to some embodiments of the invention;

FIG. 3E is a partial sectional view of the jet blade gripper of FIG. 3D holding the jet blade, according to some embodiments of the invention;

Figure 1A:
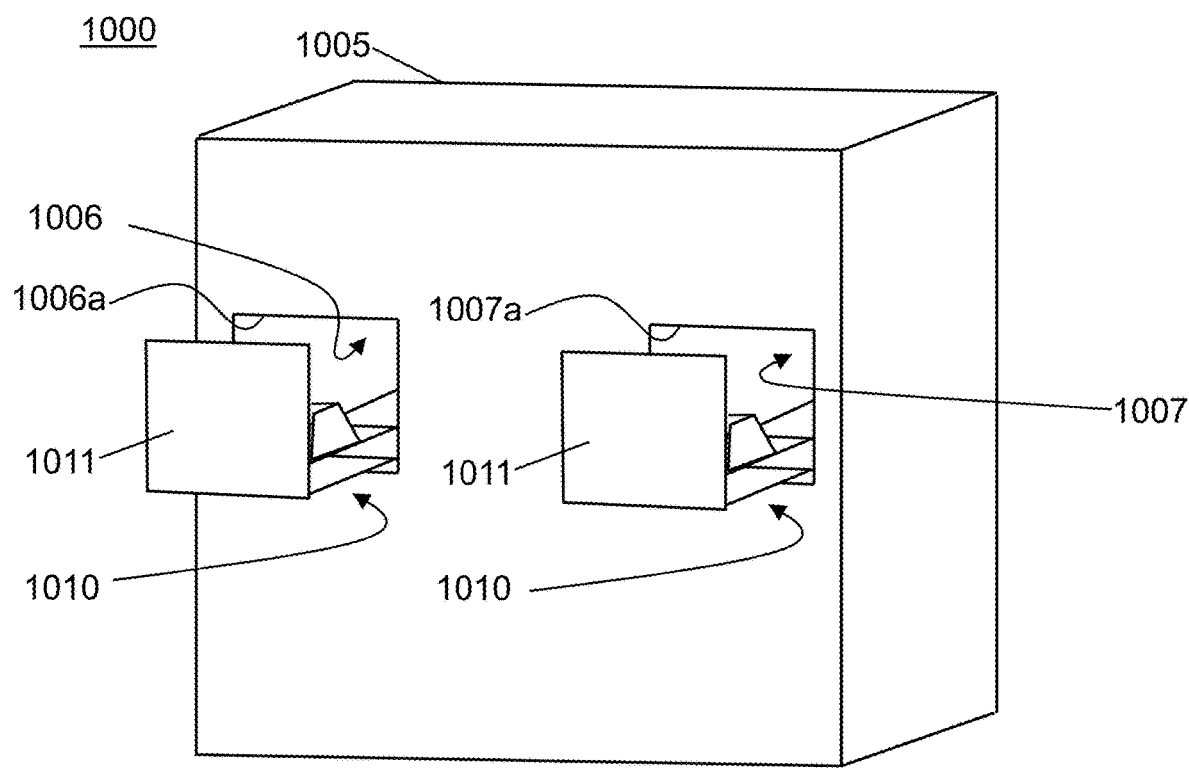
FIGS. 1A and 1B are schematic illustrations of a housing of a system for inspecting a jet blade, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Jet blades, such as jet blades used in aeroengines, typically have complex geometries. For example, jet blades may have twisted airfoils and tree-like shaped roots. Surfaces of jet blades may include a plurality of bends, twists, undercuts and/or hidden areas. Non-destructive imaging, testing and evaluation of jet blades may be challenging due to complex geometries of jet blades. Embodiments of the present invention may improve non-destructive inspection, testing and evaluation of jet blades.

Some embodiments of the present invention may provide a system for non-destructive inspection, testing, examination and/or evaluation of a jet blade. The system may include a jet blade support assembly (e.g., conveyor). The jet blade support assembly may include a sub-frame. The jet blade support assembly may include a gripper support coupled to the sub-frame and tiltable with respect to the sub-frame about a tilting axis. The jet blade support assembly may include a jet blade gripper that may hold at least a root of the jet blade. The jet blade gripper may be formed from a material that is at least partially transmissive to light. The jet blade gripper may be couplable to the gripper support and rotatable with respect to the gripper support about a gripper rotation axis that is perpendicular (or substantially perpendicular) to the tilting axis. The system may include a first illumination device that may illuminate at least the root of the jet blade at least partially through the light transmissive jet blade gripper. The system may include a second illumination device that may illuminate at least a portion of the jet blade in a direction that is different from the illumination direction of the first illumination device. The system may include a backlight illumination plate. The system may include an x-ray source and a scintillator. The system may include an optical acquisition sub-system that may capture images of the jet blade. The system may include a controller that may control the operation of the system based on an inspection protocol, parameters of the jet blade (e.g., geometrical parameters such digital twin of the jet blade) and/or images captured by the optical acquisition sub-system. Controlled tilting of the gripper support, controlled rotation of the light-transmissive jet blade gripper and controlled illumination of the jet blade by the first illumination device, the second illumination device and/or backlight illumination plate may allow the optical acquisition sub-system to capture a plurality of images covering the entire (or substantially entire) surface of the jet blade, including the surface of the root of the jet blade, from different directions, under different illumination conditions and/or under different magnification conditions. Operational parameters of the optical acquisition sub-system may be adjusted (e.g., by the controller of the system or by a controller of the optical acquisition sub-system) to ensure that the images acquired by the optical acquisition sub-system have desired image parameters (e.g., such as a desired field of view, magnification, focus and/or any other image parameters). Based on at least a portion of the images, the computing device may determine an existence or an absence of a defect in the jet blade. Based on at least a portion of the images, the computing device may determine dimensions of the jet blade.

Figure 1B:
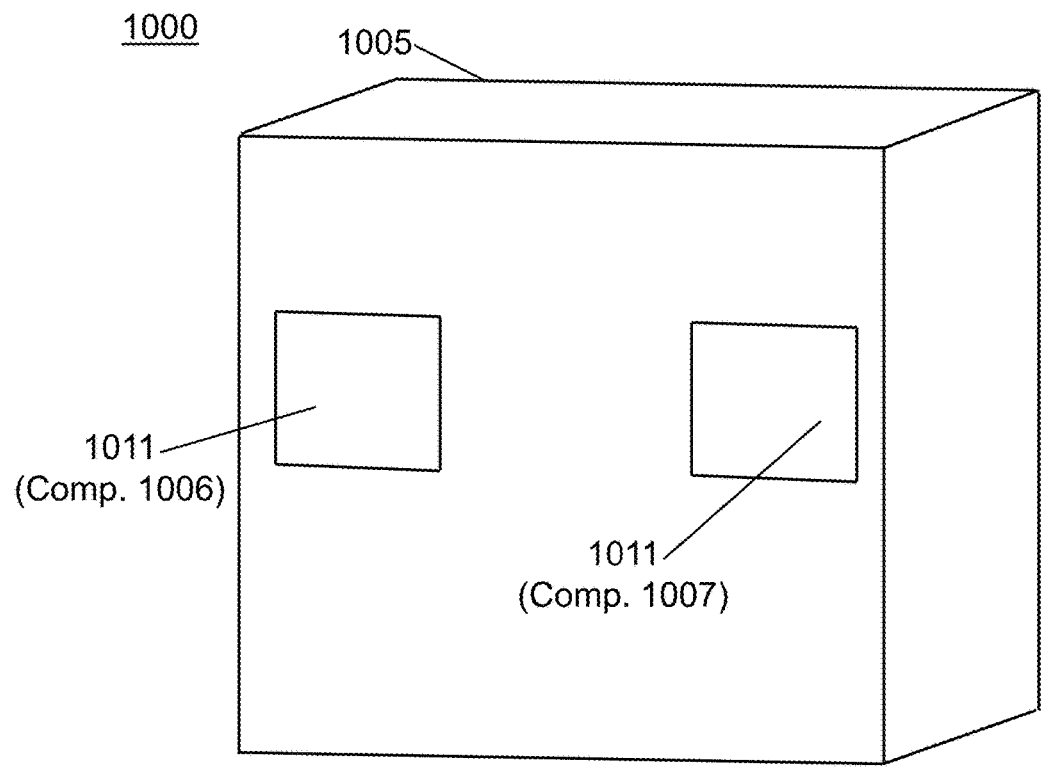

Reference is made to FIGS. 1A and 1B, which are schematic illustrations of a housing 1005 of a system 1000 for inspection a jet blade 90, according to some embodiments of the invention. FIGS. 1A and 1B show a perspective view of housing 1005.

System 1000 (e.g., "Aeroscanner" system) may include a housing 1005. Housing 1005 may include one or more compartments. In the example of FIGS. 1A and 1B, housing 1005 includes a first compartment 1006 and a second compartment 1007.

First compartment 1006 may include an opening 1006a through which compartment 1006 may be accessed. Second compartment 1007 may include an opening 1007a through which compartment 1007 may be accessed. System 1000 may include one or more jet blade support assemblies 1010. In the example of FIGS. 1A and 1B, system 1000 includes two jet blade support assemblies 1010, one in each of compartments 1006, 1007. Each of jet blade support assemblies 1010 may support a jet blade 90 (e.g., as described hereinbelow). Each of jet blade support assemblies 1010 may be extractable from within respective compartment 1006, 1007 and retractable into respective compartments 1006, 1007 of housing 1005. FIG. 1A shows jet blade support assemblies 1010 in their extracted positions and FIG. 1B shows jet blade support assemblies 1010 in their retracted positions. Each of jet blade support assemblies 1010 may include a cover 1011 that may close respective opening 1006a, 1007a of respective compartment 1006, 1007 when respective jet blade support assembly 1010 is retracted into respective compartment 1006, 1007. Housing 1005 and/or cover 1011 of each of jet blade support assemblies 1010 may be lightproof (e.g., to prevent light from entering and/or escaping respective compartment 1006, 1007 when respective jet blade support assembly 1010 is retracted into respective compartment 1006, 1007. Compartments 1006, 1007 may include components of system 1000 (e.g., as described hereinbelow).

Reference is made to FIGS. 1C and 1D, which are schematic illustrations of components of system 1000 for optical inspection of jet blade 90, according to some embodiments of the invention. The components shown in FIGS. 1C and 1D may be disposed within housing 1005 of system 1000, for example within first compartment 1006 of housing 1005. FIG. 1C shows a perspective view of the components, and FIG. 1D shows a side view of the components.

System 1000 may include a frame 1008. Frame 1008 may be disposed within housing 1005 of system 1000. Frame 1008 may support components of system 1000. Frame 1008 may include shock absorbers 1009, for example to absorb external shocks and/or vibrations.

Jet blade support assembly 1010 may be coupled to frame 1008. Jet blade support assembly 1010 may include a sub-frame 1012. Sub-frame 1012 may be coupled to frame 1008 of system 1000. Sub-frame 1012 of jet blade support assembly 1010 may be movable with respect to frame 1008 in directions 1012*b* that are parallel a first axis 1008*a*, for example to extract and retract jet blade support assembly 1010 from and into compartment 1006 of housing 1005. System 1000 may include an actuator 1012*a* to move sub-frame 1012 in directions that are parallel to first axis 1008*a*.

Jet blade support assembly 1010 may include a gripper support 1020. Gripper support 1020 may be coupled to sub-frame 1012. Gripper support 1020 may be rotatably coupled to sub-frame 1012. Gripper support 1020 may be tiltable with respect to sub-frame 1012 about a tilting axis 1021. System 1000 may include an actuator 1021*a* to cause gripper support 1020 to tilt about tilting axis 1021.

Jet blade support assembly 1010 may include a jet blade gripper 1030. Jet blade gripper 1030 may hold a jet blade 90. Jet blade gripper 1030 may removably hold jet blade 90. Jet blade gripper 1030 may hold, e.g. removably hold, a root 91 (or at least root 91) of jet blade 90. Jet blade gripper 1030 may be formed of a material that is at least partially transmissive to light. For example, the material may be at least partly transmissive to light in wavelength range of 200 to 1,000 nm. For example, jet blade gripper 1030 may be formed of an optical polycarbonate, an optical polymethyl methacrylate and/or any other suitable material that is at least partially transmissive to light in the wavelength range of 200 to 1,000 nm.

Jet blade gripper 1030 may be coupled to gripper support 1020. Gripper support 1020 may be a flat (or substantially flat) platform or structure sized to support jet blade gripper 1030 with jet blade 90. Jet blade gripper 1030 may be removably couplable to gripper support 1020. Jet blade gripper 1030 may be rotatable with respect to gripper support 1020 about a gripper rotation axis 1031. Gripper rotation axis 1031 may be perpendicular (or substantially perpendicular) to tilting axis 1021. System 1000 may include an actuator 1031*a* that may cause jet blade gripper 1030 to rotate about gripper rotation axis 1031. Actuator 1031*a* may be coupled to gripper support 1020. Jet blade gripper 1030 may hold jet blade 90 such that a longitudinal axis 92 of jet blade 90 is parallel (or substantially parallel) to gripper rotation axis 1031.

System 1000 may include a plurality of jet blade grippers 1030. For example, as the shape of jet blade 90 may change during the manufacturing process thereof, different jet blade grippers 1030 may be used at different stages of the manufacturing process based on a given shape of root 91 of jet blade 90 to securely hold root 91 of jet blade 90 and position jet blade 90 in system 1000 for inspection. Jet blade gripper 1030 may be disposable. For example, jet blade gripper 1030 may be intended to be used once, or until no longer useful, and then thrown away.

Jet blade gripper 1030 may include an identifier 1032. Identifier 1032 may be unique for each particular jet blade gripper 1030. Identifier 1032 may be used to identify jet blade gripper 1030 and jet blade 90 affixed within jet blade gripper 1030 through the inspection and/or the manufacturing process of jet blade 90. Identifier 1032 may include a radiofrequency identifier (RFID), a visional identifier (e.g., a barcode or QR code formed on external surface of jet blade gripper 1030) and/or any other suitable identifier.

System 1000 may include a weight sensor 1033 (e.g. shown in FIG. 1D). Weight sensor 1033 may measure the weight of jet blade gripper 1030 and jet blade 90 affixed therein when jet blade gripper 1030 is coupled to gripper support 1020. Weight sensor 1033 may be coupled to gripper support 1020.

While FIGS. 1C and 1D show gripper support 1020 supporting single jet blade gripper 1030, gripper support 1020 may support (e.g. rotatably support) more than one jet blade gripper 1030, for example two, three, four and/or any other suitable number of jet blade grippers 1030, for example to allow simultaneous inspection of a plurality of jet blades 90 in a single inspection cycle (e.g. as described hereinbelow).

System 1000 may include a first illumination device 1040. First illumination device 1040 may illuminate at least a portion of jet blade 90 (e.g., at least root 91 of jet blade 90) at least partially through an interior of jet blade gripper 1030. First illumination device 1040 may emit light in a first illumination direction 1042 that is parallel (or substantially parallel) to gripper rotation axis 1031 and/or longitudinal axis 92 of jet blade 90. First illumination device 1040 may be coupled to gripper support 1020. First illumination device 1040 may be disposed between gripper support 1020 and jet blade gripper 1030 when jet blade gripper 1030 is coupled to gripper support 1020. In one example, first illumination device 1040 may be a multispectral illumination device which may emit light in the wavelength range of, for example, 200-1,000 nm. In another example, first illumination device 1040 may be a monochrome illumination device. First illumination device 1040 may provide illumination of at least a portion, e.g. at least root 91, of jet blade 90. First illumination device 1040 may provide a wide field illumination of at least a portion, e.g. at least root 91, of jet blade 90.

In the example of FIGS. 1C and 1D, first illumination device 1040 includes a plurality of light emitting elements (e.g., light emitting diodes (LEDs)) 1041 arranged along a curve corresponding (or substantially corresponding) to a perimeter of a bottom surface of jet blade gripper 1030. First illumination device 1040 may include one or more polarizers, for example to reduce reflection of light emitted by first illumination device 1040. However, any other suitable configurations of first illumination device 1040 may be used.

System 1000 may include a second illumination device 1050. Second illumination device 1050 may illuminate at least a portion of jet blade 90 in a second illumination direction 1052 that is different from first illumination direction 1042 of first illumination device 1040. Second illumination device 1050 and first illumination device 1040 may illuminate respective portions of jet blade 90 from different (or substantially different) directions. Second illumination direction 1052 of second illumination device 1050 may be perpendicular (or substantially perpendicular) to first illumination direction 1042 of first illumination device 1040. Second illumination direction 1052 may be perpendicular (or substantially perpendicular) to titling axis 1021 and gripper rotation axis 1031. Second illumination device 1050 may illuminate (e.g., directly illuminate) at least a portion of a foil surface 93 of jet blade 90 and/or illuminate (e.g., through the interior of jet blade gripper 1030) at least a portion of root 91 of jet blade 90. In one example, second illumination device 1050 may be a multispectral illumination device which may emit light in the wavelength range of, for example, 200-1,000 nm. In another example, second illumination device 1050 may be a monochrome illumination device. Second illumination device 1050 may illuminate at least a portion of jet blade 90 from one or more illumination angles. For example, the angles may range between 15 and 45 degrees relative to an optical axis 1064 of an optical acquisition sub-system 1060 (described hereinbelow). Second illumination device 1050 may provide a wide field illumination of at least a portion of jet blade 90. Second illumination device 1050 may include one or more polarizers, for example to reduce glare caused by light rejected from jet blade 90.

In operation, controlled tilting of gripper support 1020 about tilting axis 1021, controlled rotation of light-transmissive jet blade gripper 1030 about gripper rotation axis 1031 and controlled illumination from first illumination device 1040 and second illumination device 1050 may allow inspection of the entire (or substantially entire) surface of jet blade 90, including the surface of root 91 of jet blade 90, from different directions and/or under different illumination conditions.

System 1000 may include an optical acquisition sub-system 1060. Optical acquisition sub-system 1060 may include an imaging sensor 1061. In one example, imaging sensor 1061 may be a multispectral imaging sensor that may capture light in the wavelength ranging in, for example, 200-1,000 nm. In another example, imaging sensor 1061 may be a monochrome imaging sensor. In another example, imaging sensor 1061 is an RGB color sensor. Optical acquisition sub-system 1060 may include a plurality of optical elements 1062 such as lenses, aperture, movable aperture (e.g., with fixed or movable iris) and/or any other suitable components. In some embodiments, optical components 1062 include piezoelectric lenses. The piezoelectric lenses may change their focal length based on the voltage applied thereto. In some embodiments, optical components 1062 include movable lenses. The movable lenses may be moved to change the relative distance between each other and/or between the movable lenses and imaging sensor 1061. System 1000 may include actuators (e.g., such as stepper motors) 1063 to move the movable lenses. In some embodiments, optical elements 1062 include both piezoelectric lenses and movable lenses. Optical acquisition sub-system 1060 may adjust (or may be controlled to adjust) its parameters, such as focal lengths of piezoelectric lenses and/or position of movable lenses in optical acquisition sub-system 1060, for example to ensure that the image acquired by optical acquisition sub-system 1060 have the desired image parameters (e.g., such as a desired field of view, magnification, focus and/or any other image parameters). Optical acquisition sub-system 1060 may capture images of at least a portion of jet blade 90 from a direction that is perpendicular (or substantially perpendicular) to titling axis 1021 and gripper rotation axis 1031 (e.g., from a direction that is parallel (or substantially parallel) to second illumination direction 1052).

Optical acquisition sub-system 1060, or at least some of the components thereof, may be coupled to frame 1008. Optical acquisition sub-system 1060, or at least some of the components thereof, may be movable, e.g. with respect to frame 1008, in directions that are parallel to first axis 1008a. First axis 1008a may be perpendicular (or substantially perpendicular) to tilting axis 1021 and to gripper rotation axis 1031. Optical acquisition sub-system 1060, or at least some of the components thereof, may be movable, e.g. with respect to frame 1008, in directions that are parallel to a second axis 1008b. Second axis 1008b may be parallel (or substantially parallel) to tilting axis 1021. Optical acquisition sub-system 1060, or at least some of the components thereof, may be movable, e.g. with respect to frame 1008, in directions that are parallel to a third axis 1008c. Third axis 1008c may be parallel (or substantially parallel) to gripper rotation axis 1031.

In the example of FIGS. 1C and 1D, optical acquisition sub-system 1060 is coupled to frame 1008 using a sub-frame 1013. For example, sub-frame 1013 may be movable with respect to frame 1008 in directions that are parallel to second axis 1008b while optical acquisition sub-system 1060, or at least some of the components thereof, may be movable with respect to sub-frame 1013 in directions that are parallel to third axis 1008c. In this example, system 1000 may include an actuator 1013a to move sub-frame 1013 with respect to frame 1008 in directions 1013c that are parallel to second axis 1008b and an actuator 1013b to move optical acquisition sub-system 1060, or at least some of the components thereof, in directions 1013d that are parallel to third axis 1008c. In some embodiments, sub-frame 1013 may be movable (e.g., using an actuator) with respect to frame 1008 in directions that are parallel to first axis 1008a. However, other configurations of actuators are also possible to move optical acquisition sub-system 1060 or at least some of the components thereof in different directions. Optical acquisition sub-system 1060 may be coupled, e.g. movably coupled, to frame 1008 in any other suitable ways other than by sub-frame 1013.

In the example of FIGS. 1C and 1D, second illumination device 1050 is coupled to optical acquisition sub-system 1060. In the example of FIGS. 1C and 1D, second illumination device 1050 is a ring-shaped illumination device (e.g., formed of a plurality of light emitting elements (LEDs), laser diodes (LDs) and/or any other suitable devices arranged in a ring, optionally at different angles with respect to each other, e.g. to provide wide angle illumination) coaxial with an optical axis 1064 of optical acquisition sub-system 1060 and positioned in front of or around an aperture 1065 of optical acquisition sub-system 1060. Ring-shaped second illumination device 1050 coupled to optical acquisition sub-system 1060 may provide an optimal delivery of light to jet blade 90 with a minimal angle of incidence (e.g., an angle between the ray of light incident on a surface of jet blade 90 and the line perpendicular to the surface; the angle may range between 15 to 45 degrees), e.g. to ensure an optimal reflection of light from jet blade 90 towards optical acquisition sub-system 1060. However, any other suitable configurations of second illumination device 1050 may be used. Second illumination device 1050 may be coupled to structures other than optical acquisition sub-system 1060. For example, second illumination device 1050 may be coupled to frame 1008, e.g. using sub-frame 1013.

System 1000 may include a third illumination device 1070. Third illumination device 1070 may include an illumination plate (e.g., an illumination screen). Third illumination device 1070 may be positioned such that gripper support 1020 and jet blade gripper 1030 (when jet blade gripper 1030 is coupled to gripper support 1020) are disposed between third illumination device 1070 and aperture 1065 of optical acquisition sub-system 1060. For example, third illumination device 1070 may be coupled to sub-frame 1012 or cover 1011 of jet blade support assembly 1010 (e.g., as shown in FIGS. 1C-1E). Third illumination device 1070 may provide a backlight illumination of at least a portion of jet blade 90. Third illumination device 1070 may emit light (e.g. wavelength 300-1000 nm) axis 1031 (e.g., in a direction that is parallel, or substantially parallel, to second illumination direction 1052), e.g. towards aperture 1065 optical acquisition sub-system 1060. The backlight illumination provided by third illumination device 1070 may create contrast between jet blade 90 and the background highlighting a silhouette and/or edges and contours of jet blade 90 in the images captured by optical acquisition sub-system 1060.

System 1000 may include a cleaner 1080. Cleaner 1080 may clean the surface of jet blade 90. For example, cleaner 1080 may remove dust or other machining residuals from the surface of jet blade 90. Cleaner 1080 may include a conduit to apply or puff air onto the surface of jet blade 90 to clean the surface of jet blade 90. In the example of FIGS. 1C-1E, cleaner 1080 is coupled to second illumination device 1050. Coupling cleaner 1080 to second illumination device 1050 may allow moving cleaner 1050 together with second illumination device 1050 and optical acquisition sub-system 1060 while eliminating the need in a dedicated moving mechanism for cleaner 1080. In some embodiments, cleaner 1080 may be coupled to other structures of system 1000. For example, cleaner 1080 may be coupled to frame 1008, sub-frame 1013 or optical acquisition sub-system 1060.

System 1000 may include an ablation unit 1090. Ablation unit 1090 may remove (e.g., ablate) material residuals (e.g., protrusions) from the surface of jet blade 90. Ablation unit 1090 may include a laser. In the example of FIGS. 1C-1E, ablation unit 1090 is coupled to sub-frame 1013. In this example, system 1000 includes an actuator 1091 to move ablation unit 1090 in directions 1013*d*, while sub-frame 1013 provides movement of ablation unit 1090 (and other components of system 1000 coupled thereto) in directions 1012*b* with respect to frame 1012. In some embodiments, ablation unit 1090 may be coupled to frame 1012, second illumination device 1050, optical acquisition sub-system 1060 and/or any other suitable structure of system 1000 other than to sub-frame 1013. Ablation unit 1090 may be positioned along the optical path of optical acquisition sub-system 1060.

Reference is made to FIG. 1E, which is a schematic illustration of components of system 1000 for x-ray inspection of jet blade 90, according to some embodiments of the invention. The components shown in FIG. 1E may be disposed within housing 1005 of system 1000, for example within second compartment 1007 of housing 1005. FIG. 1E shows a side view of the components.

System 1000 may include an x-ray source 1100 and a scintillator 1101. Scintillator 1101 may be positioned in front of aperture 1065 of optical acquisition sub-system 1060. X-Ray source 1100 may be positioned such that gripper support 1020 and jet blade gripper 1030 of jet blade support assembly 1010 (when jet blade gripper 1030 is coupled to gripper support 1021) are disposed between x-ray source 1100 and scintillator 1101. X-ray source 1100 may be coupled to sub-frame 1012 or cover 1011 of jet blade support assembly 1010 (e.g., as shown in FIG. 1E). Scintillator 1101 may be coupled to frame 1008. scintillator 1101

X-ray source 1100 may emit x-rays towards jet blade gripper 1030 and jet blade 90 affixed within jet blade gripper 1030 and scintillator 1101 (e.g., in the direction that is perpendicular (or substantially perpendicular) to tilting axis 1021 and gripper rotation axis 1031). Scintillator 1101 may absorb the energy of the received x-rays and re-emit at least a portion of the absorbed energy as light (e.g., visible or near-visible ultraviolet light). The light emitted by scintillator 1101 may be collected by optical components 1062 and delivered to imaging sensor 1061 of optical acquisition sub-system 1060 to generate the image (e.g., x-ray image) of jet blade 90. Compartment 1007 and/or cover 1011 of jet blade support assembly 1010 disposed in compartment 1007 may include lead and/or any other suitable material that may block or attenuate x-ray radiation.

For example, once optical inspection of jet blade 90 in first compartment 1006 is complete, the technician can move jet blade 90 to second compartment 1007 for x-ray inspection of jet blade 90. Optical acquisition sub-system 1060 may be moved between first compartment 1006 and second compartment 1007, for example by moving sub-frame 1013 in directions that are parallel to second axis 1008*b* (e.g., as described hereinabove). Such configuration of system 1000 may allow having single optical acquisition sub-system 1060 in system 1000 for both optical and x-ray inspections. However, other configurations of system 1000 may be used. For example, system 1000 may have optical acquisition sub-system 1060 and other suitable components in each of compartments 1006, 1007.

System 1000 may include a computing device 1200 (e.g., as shown in FIGS. 1C, 1D and 1E). Computing device 1200 may control the operation of components of system 1000. Computing device 1200 may control the operation of components of system 1000 based on an inspection protocol, parameters of jet blade 90 and/or based on the images of jet blade 90 captured by optical acquisition sub-system 1060, for example as described below.

In order to inspect jet blade 90, jet blade 90 may be securely affixed in jet blade gripper 1030. Jet blade support assembly 1010 may be extracted from within, for example, compartment 1006 of housing 1005 of system 1000. Jet blade gripper 1030 with jet blade 90 affixed therein may be coupled to gripper support 1020 of jet blade support assembly 1010. Jet blade support assembly 1010 may be then retracted back to compartment 1006. The extraction and retraction of jet blade support assembly 1010 may be manual or automatic (e.g., controlled by computing device 1200).

In some embodiments, prior to affixing jet blade 90 within jet blade gripper 1030 and insertion thereof into system 1000, jet blade 90 may be covered or sprayed with fluorescent liquid penetrant. The fluorescent liquid penetrant (e.g., such as water washable fluorescent Mangaflux material and/or any other suitable material) may increase the sensitivity and capability of system 1000 to detect smaller defects such as cracks in jet blade 90, which, for example, may be not visible or hardly visible under white illumination. First illumination device 1040 and/or second illumination device 1050 may emit light in the wavelength of 200 to 400 nm (e.g., ultraviolet light). System 1000 may include a dedicated illumination device that may light in the wavelength of 200 to 400 nm (e.g., ultraviolet light). The ultraviolet light may allow viewing fluorescent covered or sprayed smaller defects such as cracks in jet blade 90.

Computing device 1200 may be programmed to set operational parameters of system 1000 based on parameters of jet blade 90. For example, computing device 1200 may receive as an input (e.g. via a user interface or input device) geometrical parameters (e.g., such as type, dimensions and/or shape) of jet blade 90 and/or any other suitable parameters of jet blade 90. The geometrical parameters of jet blade 90 may be provided to computing device 1200 as digital twin model of jet blade 90. In one example, based on the received parameters of jet blade 90, computing device 1200 may determine an inspection protocol or select an inspection protocol from a plurality of predetermined inspection protocols, and control the operation of components of system 1000 based on the inspection protocol. For example, based on the received parameters (e.g., based on the digital twin) of jet blade 90, computing device 1200 may determine a plurality of tilting positions between which gripper support 1020 to be tilted, a plurality of angular positions between which jet blade gripper 1030 to be rotated, illumination parameters of first, second and/or third illumination devices 1040, 1050, 1070, respectively, operational parameters of optical acquisition sub-system 1060 and/or any other suitable parameters of system 1000 to ensure inspection of the entire (or substantially entire) surface of jet blade 90 from desired directions and/or under desired illumination conditions. For example, based on the digital twin (e.g., geometry, dimensions, surfaces and/or any other suitable parameters) of jet blade 90 and/or a model of master non-defected jet blade 90 (e.g., "Golden" jet blade), computing device 1200 may determine areas (e.g., hidden areas) that may include or frequently include defects (e.g., due to the manufacturing process), and based on the determine areas determined the tilting and angular positions, the illumination parameters and/or the operational parameters to ensure that the determined areas are inspected. For example, computing device 1200 may utilize a pre-trained machine learning model which may receive the digital twin of jet blade 90 and/or the model of the master non-defected jet blade 90 as an input, determine the areas (e.g., hidden areas) that may include or frequently include defects, based on the determined areas, determine the tilting and angular positions, the illumination parameters and/or the operational parameters and provide the determined areas and/or the tilting and angular positions, the illumination parameters and/or the operational parameters as an output.

Based on the received parameters (e.g., based on the digital twin) of jet blade 90, computing device 1200 may adjust parameters of optical acquisition sub-system 1060 to achieve to achieve images having desired image parameters (e.g., such as a desired field of view, magnification, focus and/or any other image parameters), e.g. for each or at least a portion of the tilting positions of gripper support 1020 and the angular positions of jet blade gripper 1030. For example, in order to achieve the desired focus, computing device 1200 may change the voltage applied on the piezoelectric lenses and/or by change relative position of the movable lenses (e.g., optical elements 1062) in optical acquisition sub-system 1060 for each or at least a portion of the tilting positions of gripper support 1020 and the angular positions of jet blade gripper 1030. In another example, optical acquisition sub-system 1060 may include a controller that may adjust the parameters of optical acquisition sub-system 1060 based on received parameters (e.g., based on the digital twin) of jet blade 90, for example to achieve images having desired image parameters (e.g., such as a desired field of view, magnification, focus and/or any other image parameters).

Based on the inspection protocol, computing device 1200 may cause gripper support 1020 to tilt about tilting axis 1021 between the plurality of tilting positions and/or cause jet blade gripper 1030 to rotate about gripper rotation axis 1031 between the plurality of angular positions. For example, the tilting and/or the rotation may be continuous or incremental.

Based on the inspection protocol, computing device 1200 may control first illumination device 1040 and second illumination device 1050 to illuminate respective portions of jet blade 90. In one example, computing device 1200 may control first illumination device 1040 to illuminate root 91 of jet blade 90 from a particular direction corresponding to a current angular position of jet blade gripper 1030 with respect to optical acquisition sub-system 1060, e.g. by activating respective light emitting elements 1041 of first illumination device 1040. In another example, computing device 1200 may control first illumination device 1040 to illuminate root 91 of jet blade 90 from a plurality of directions or from all directions during the inspection process, e.g. independently of the angular position of jet blade gripper 1030 with respect to optical acquisition sub-system 1060. Each of light emitting elements 1041 of first illumination device 1040 may be operated independently of other light emitting elements of first illumination device 1040. A subset of light emitting elements 1041 of first illumination device 1040 may be operated independently of other subsets of light emitting elements of first illumination device 1040. For each of at least a portion of the tilting positions of gripper support 1020 and/or the angular positions of jet blade gripper 1030, computing device 1200 may control first illumination device 1040 and second illumination device 1050 to illuminate respective portions of jet blade 90 simultaneously (e.g., at the same time) or sequentially (e.g., turn off second illumination device 1050 when first illumination device 1040 is operating and turn off first illumination device 1040 when second illumination device 1050 is operating). Computing device 1200 may control illumination parameters (e.g., such as illumination intensity or power, illumination wavelength and/or illumination angles) of each of first illumination device 1040 and second illumination device 1050. For example, computing device 1200 may determine (e.g., based on the inspection protocol) the optimal illumination intensity or power and/or illumination wavelength of each of first illumination device 1040 and second illumination device 1050 for each or at least a portion of the titling positions of gripper support 1020 and/or for each or at least a portion of the angular positions of jet blade gripper 1030. The optical illumination intensity and/or wavelength may be determined for each jet blade 90 (e.g., each type of jet blade 90) based on the digital twin of jet blade 90 and/or master non-defected jet blade 90.

At each of at least a portion of the titling positions of gripper support 1020 and/or the angular positions of jet blade gripper 1030, computing device 1200 may turn on illumination plate 1070 to provide backlight illumination of jet blade 90. For example, prior to turning on illumination plate 1070, computing device 1200 may turn off first illumination device 1040 and second illumination device 1050.

At each of at least a portion of the titling positions of gripper support 1020 and/or the angular positions of jet blade gripper 1030, computing device 1200 may control imaging sensor 1061 of optical acquisition sub-system 1060 to capture one or more images of jet blade 90. Based on the one or more images of jet blade 90, computing device 1200 may determine whether or not optical system 1060 is in focus (e.g., whether or not the one or more images are clear and sharp). If it is determined that optical system is not in focus, computing device 1200 may adjust the parameters of optical acquisition sub-system 1060 (e.g., as described above) to focus optical acquisition sub-system 1060. Computing device 1200 may then control imaging sensor 1061 of optical acquisition sub-system 1060 to recapture the one or more images of jet blade 90 for the particular titling position of gripper support 1020 and angular position of jet blade gripper 1030. In another example, the controller of optical acquisition sub-system 1060 may adjust the parameters of optical acquisition sub-system 1060 (e.g., as described above) based on the one or more images of jet blade 90 to achieve images having desired image parameters (e.g., such as a desired field of view, magnification, focus and/or any other image parameters. In one example, the desired image parameters may be determined by a technician. In another example, the desired image parameters may be determined using a pre-trained machine learning model. The machine learning model may receive the digital twin of jet blade 90 and/or the model of master non-defected jet blade 90 as an input, determine the areas (e.g., hidden areas) that may include or frequently include defects, based on the determined areas determine the desired image parameters to ensure those areas can be clearly visible in the images, and provide the desired image parameters as an output.

At each of at least a portion of the titling positions of gripper support 1020 and/or the angular positions of jet blade gripper 1030, computing device 1200 may cause optical acquisition sub-system 1060, or at least some of the components thereof, to move in directions that are parallel to one or more of first axis 1008a, second axis 1008b and third axis 1008c, e.g. to capture images of different portions of jet blade 90 and/or magnify and/or focus on different portions of jet blade 90 for the respective titling and/or angular position.

At at least a portion of the titling positions of gripper support 1020 and/or the angular positions of jet blade gripper 1030, computing device 1200 may cause cleaner 1080 to clean the surface of jet blade 90, e.g. by applying or puffing air onto the surface of jet blade 90.

If an x-ray imaging is desired, once the optical inspection of jet blade 90 in first compartment 1006 is complete, the technician may move jet blade gripper 1030 holding jet blade 90 from first compartment 1006 to second compartment and couple jet blade gripper 1030 holding jet blade 90 within jet blade assembly 1010 of second compartment 1007. At each of at least a portion of the titling positions of gripper support 1020 and/or the angular positions of jet blade gripper 1030, computing device 1200 may control imaging sensor 1061 of optical acquisition sub-system 1060 to capture one or more images x-ray images of jet blade 90. If three-dimensional x-ray imaging of jet blade 90 is required, computing device 1200 may move optical acquisition system 1060 in directions that are parallel to third axis 1008c, e.g. for each of at least a portion of the titling positions of gripper support 1020 and/or the angular positions of jet blade gripper 1030.

During the inspection procedure, a plurality of images of jet blade 90 may be captured by optical acquisition sub-system 1060 from different directions that cover the entire (or substantially entire) surface of jet blade 90, including root 91 of jet blade 90, under different illumination conditions (e.g., as described hereinabove). Computing device 1200 may tag or label each of the plurality of images with identification information of jet blade 90 and/or the particular tilting position of gripper support 1020 and/or the particular angular position of jet blade gripper 1030 for which the respective image has been captured. Computing device 1200 may determine the identification information of jet blade 90 based on identifier 1032 of jet blade gripper 1030 holding jet blade 90 (e.g., either using RFID sensor or image processing to process the barcode or QR code of identifier 1032).

Based on at least a portion of the plurality of images of jet blade 90, computing device 1200 may determine an existence or an absence of a defect in jet blade 90. The defects may include cracks, fractures, laps, seams, protrusions and/or any other defects. If the defect is detected, computing device 1200 may make a respective record in a jet blades repository (e.g. stored in a memory of computing device 1200) and/or transmit a respective notification to the technician and/or quality control staff in the facility. If a protrusion on the surface of jet blade 90 is detected, based on the one or more images computing device 1200 may determine the exact location of the protrusion on the surface of jet blade 90 and bring gripper support 1020, jet blade gripper 1030 and ablation unit 1090 into positions that may allow ablation unit 1090 to remove the detected protrusion. Computing device 1200 may then control ablation unit 1090 to remove the protrusion from the surface of jet blade 90.

Based on signal from weight sensor 1033 and known weight of jet blade gripper 1030, computing device 1200 may determine the weight of jet blade 90. Computing device 1200 may save the weight of jet blade 90 in the jet blades repository.

Based on at least a portion of the plurality of images of jet blade 90, computing device 1200 may determine dimensions of jet blade 90. Computing device 1200 may save the dimensions of jet blade 90 in the jet blades repository. Computing device 1200 may compare the determined dimensions of jet blade 90 to the digital twin of jet blade 90. Based on the comparison, computing device 1200 may determine whether or not jet blade 90 has dimensions that are not within permitted limits and make respective record in the jet blades repository.

In one example, computing device 1200 may determine the existence or the absence of the defect in jet blade 90 and/or whether or not jet blade 90 has dimensions that are not within the permitted limits based on least a portion of the plurality of images of jet blade 90 by comparing the images to the digital twin of jet blade 90 and/or the model of the master non-defected jet blade 90 (e.g., "Golden" jet blade 90). In another example, computing device 1200 may determine the existence or the absence of the defect in jet blade 90 and/or whether or not jet blade 90 has dimensions that are not within the permitted limits by providing at least a portion of the plurality of images of jet blade 90 as an input to a pre-trained machine learning model which may be trained to process the images and provide an indication of the existence or the absence of the defect in jet blade 90 and/or whether or not jet blade 90 has dimensions that are not within the permitted limits as an output.

Figure 2A:
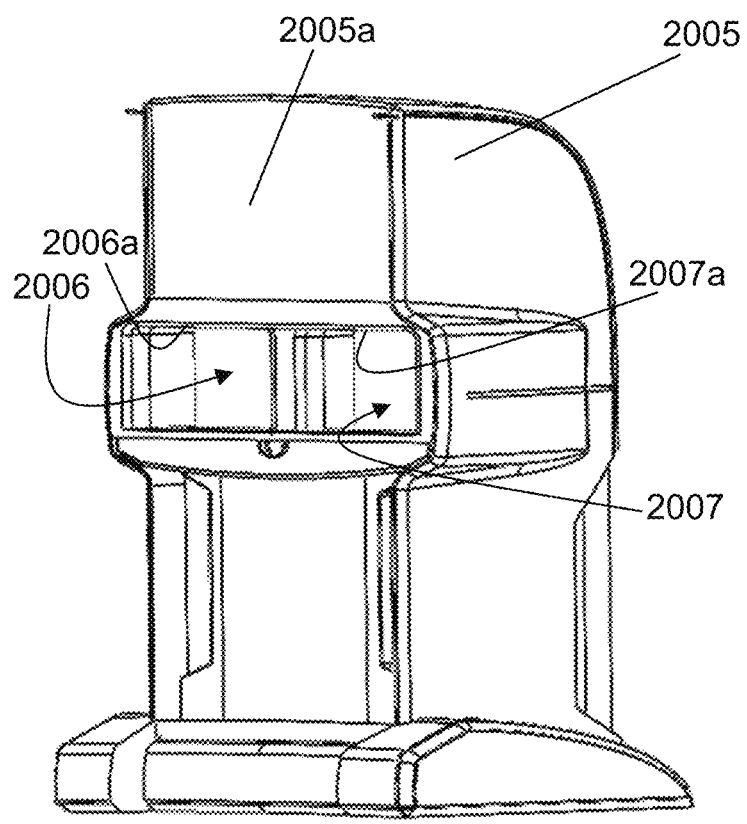
FIG. 2A is a 3D diagram of the housing of the system for inspecting jet blades, according to some embodiments of the invention.

Reference is made to FIG. 2A, which is a 3D diagram of a housing 2005 of a system 2000 for inspecting jet blades, according to some embodiments of the invention.

System 2000 may include a housing 2005. Housing 2005 may include a user interface 2005a (e.g., such as touch screen). Housing 2005 may include a first compartment 2006 and a second compartment 2007. First compartment 2006 may include an opening 2006a through which first compartment 2006 may be accessed. Second compartment 2007 may include an opening 2007a through which second compartment 2007 may be accessed. Each of compartments 2006, 2007 may accommodate a jet blade support assembly 2010 (not shown in FIG. 2A for simplicity). Housing 2005 and compartments 2006, 2007 may be lightproof to prevent light from entering and/or escaping compartments 2006, 2007.

Figure 2C:
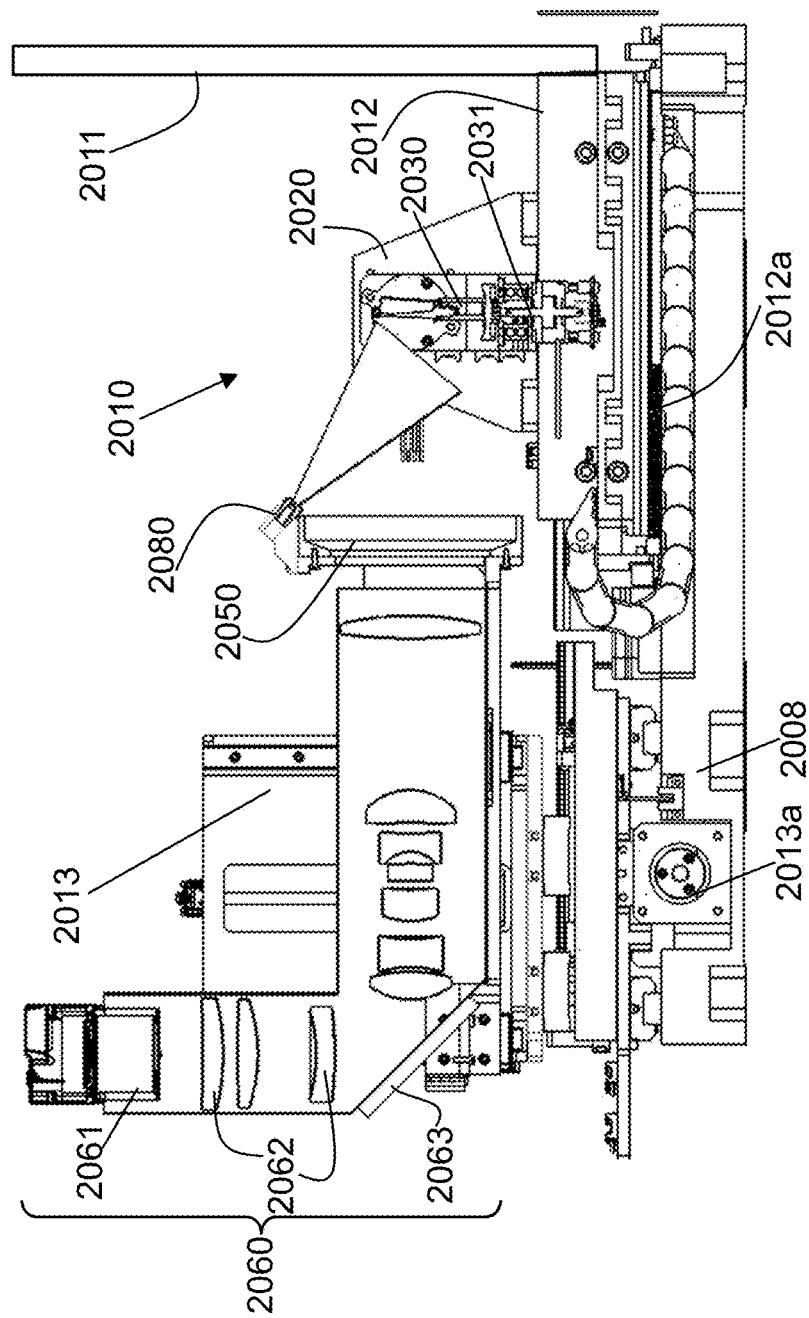

Reference is made to FIGS. 2B and 2C, which are 3D diagram of components of system 2000, according to some embodiments of the invention. FIG. 2B shows a perspective view and FIG. 2C shows a side view of the components.

Figure 2D:
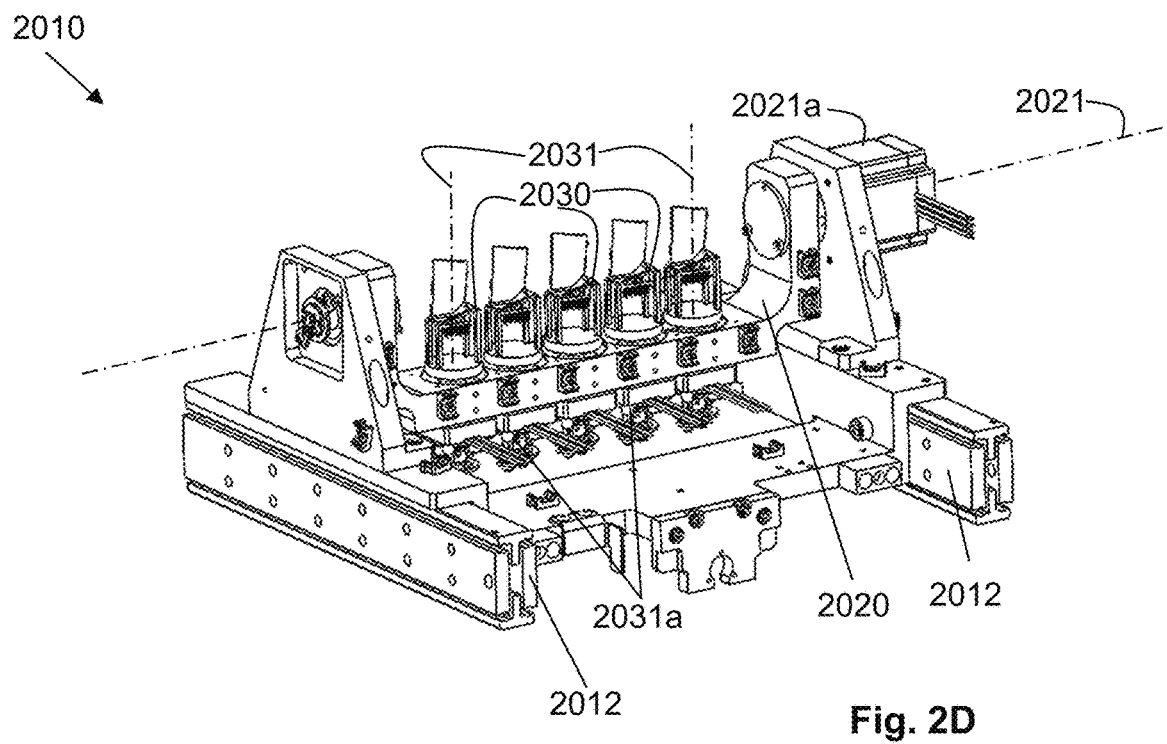
FIGS. 2D, 2E and 2F are 3D diagrams of a jet blade support assembly of the system, according to some embodiments of the invention.
Figure 2E:
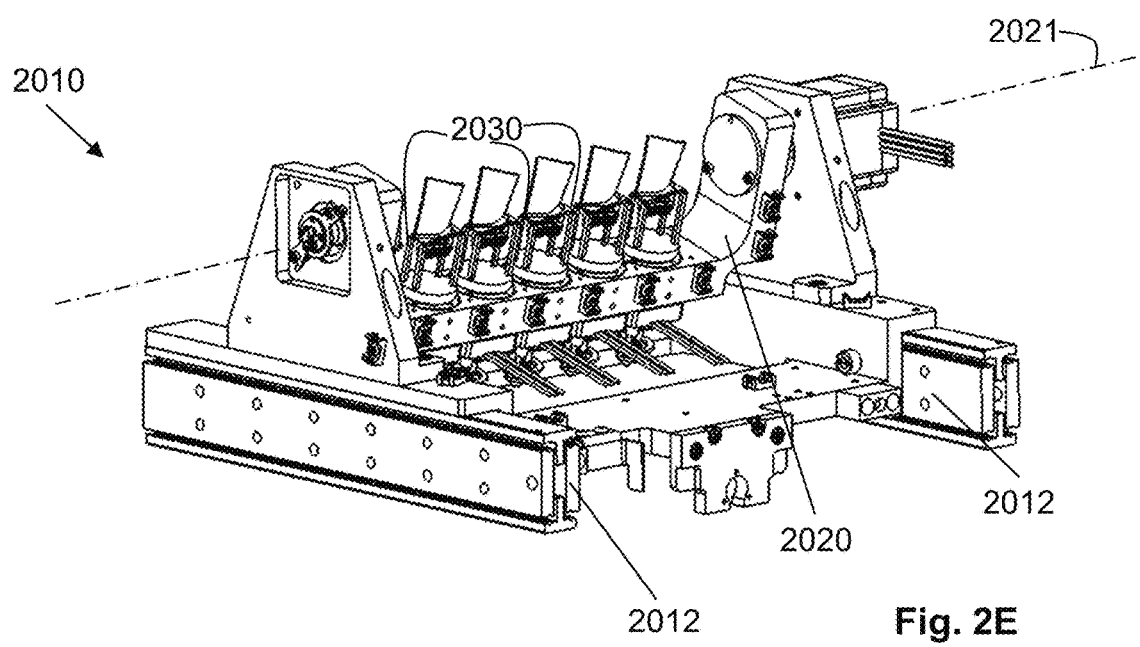
Figure 2F:
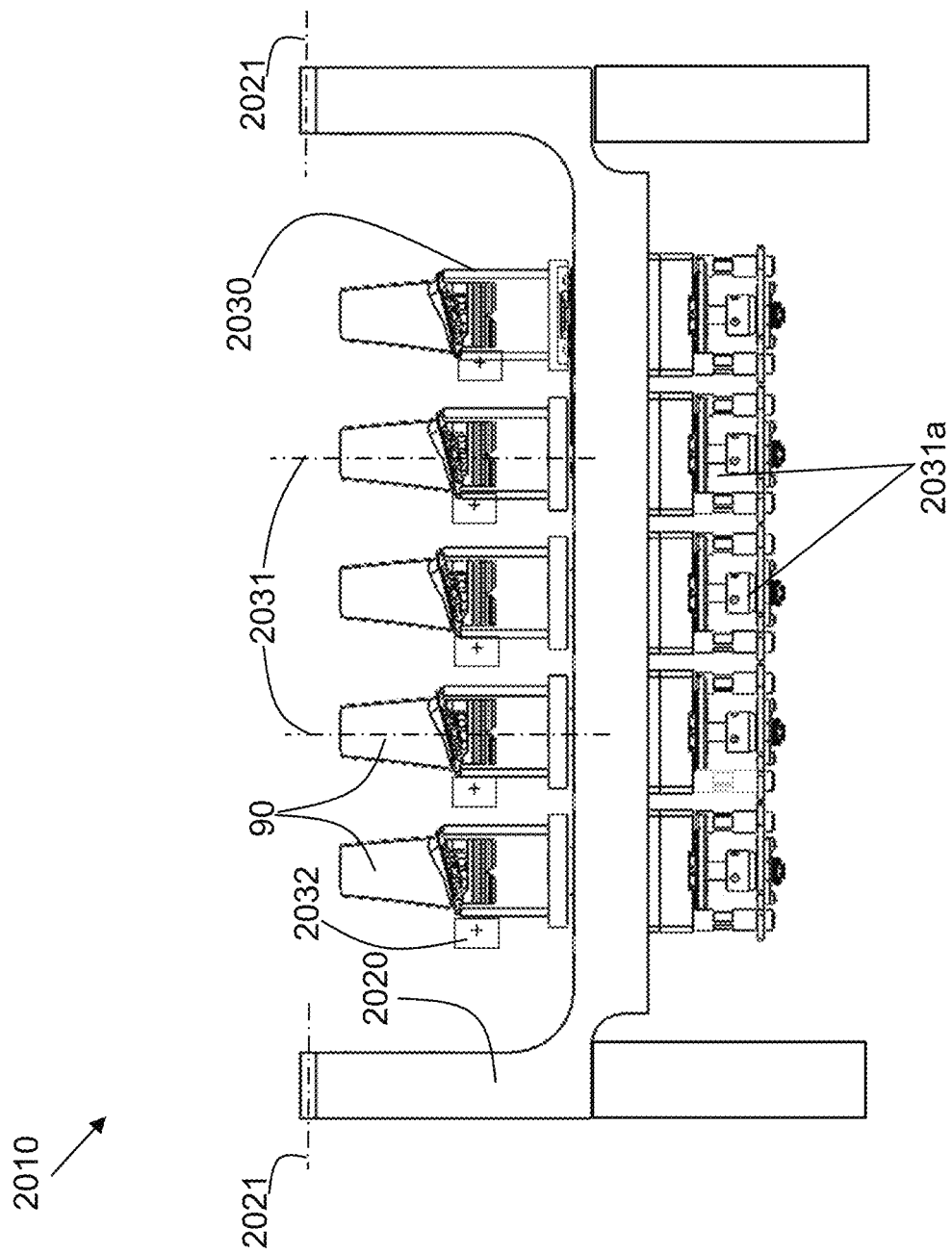

Reference is also made to FIGS. 2D, 2E and 2F, which are 3D diagrams of a jet blade support assembly 2010 of system 2000, according to some embodiments of the invention.

Figure 2H:
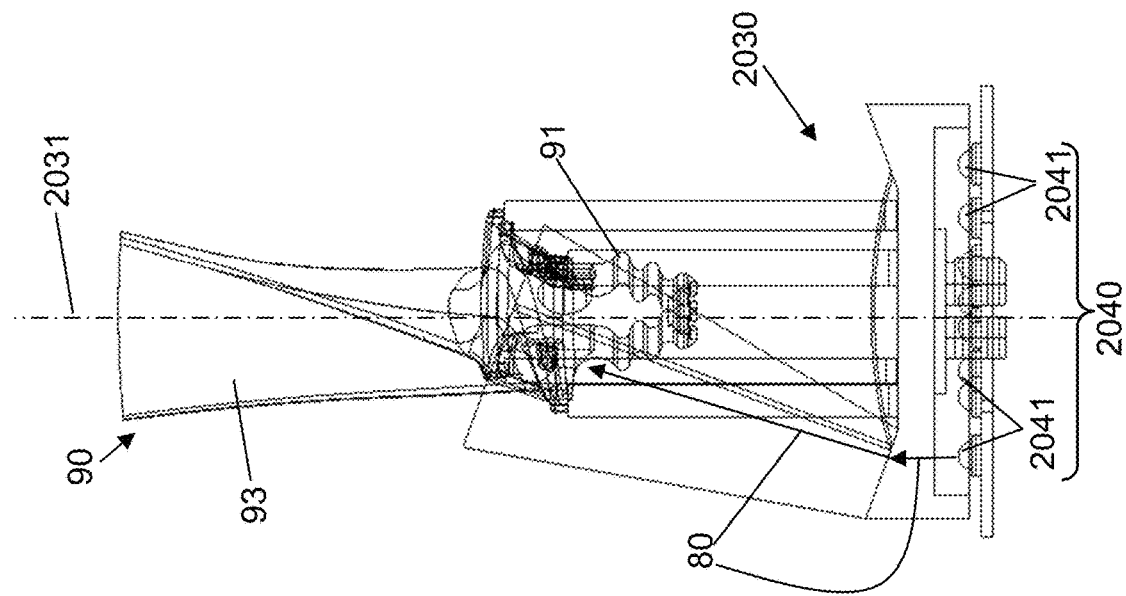
FIGS. 2G and 2H are 3D diagrams of a jet blade gripper, jet blade and a first illumination device of the system, according to some embodiments of the invention.
Figure 2G:
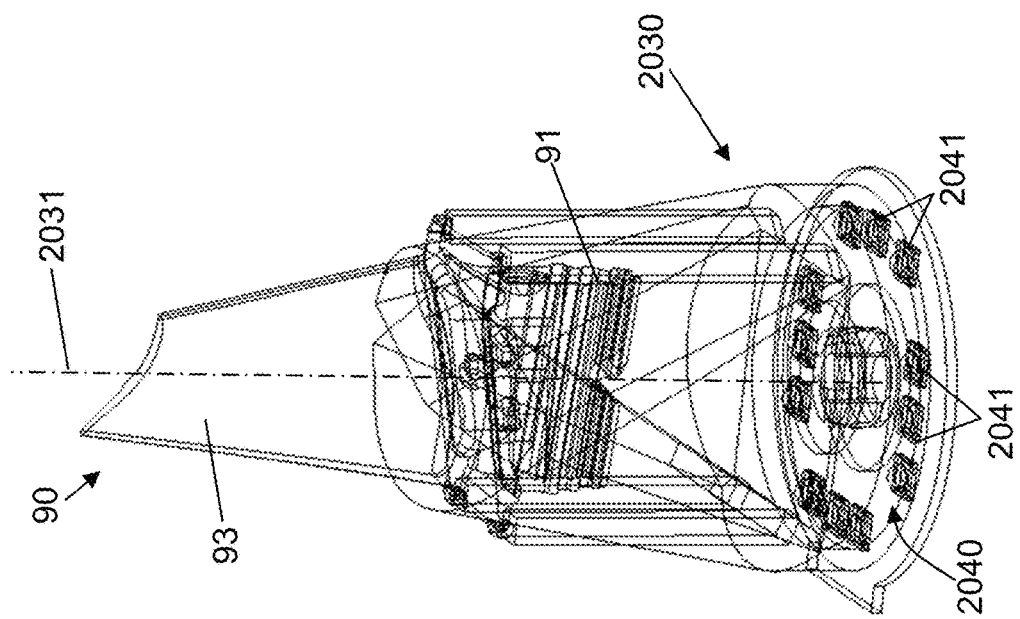

Reference is also made to FIGS. 2G and 2H, which are 3D diagrams of a jet blade gripper 2030, jet blade 90 and a first illumination device 2040, according to some embodiments of the invention.

Figure 2I:
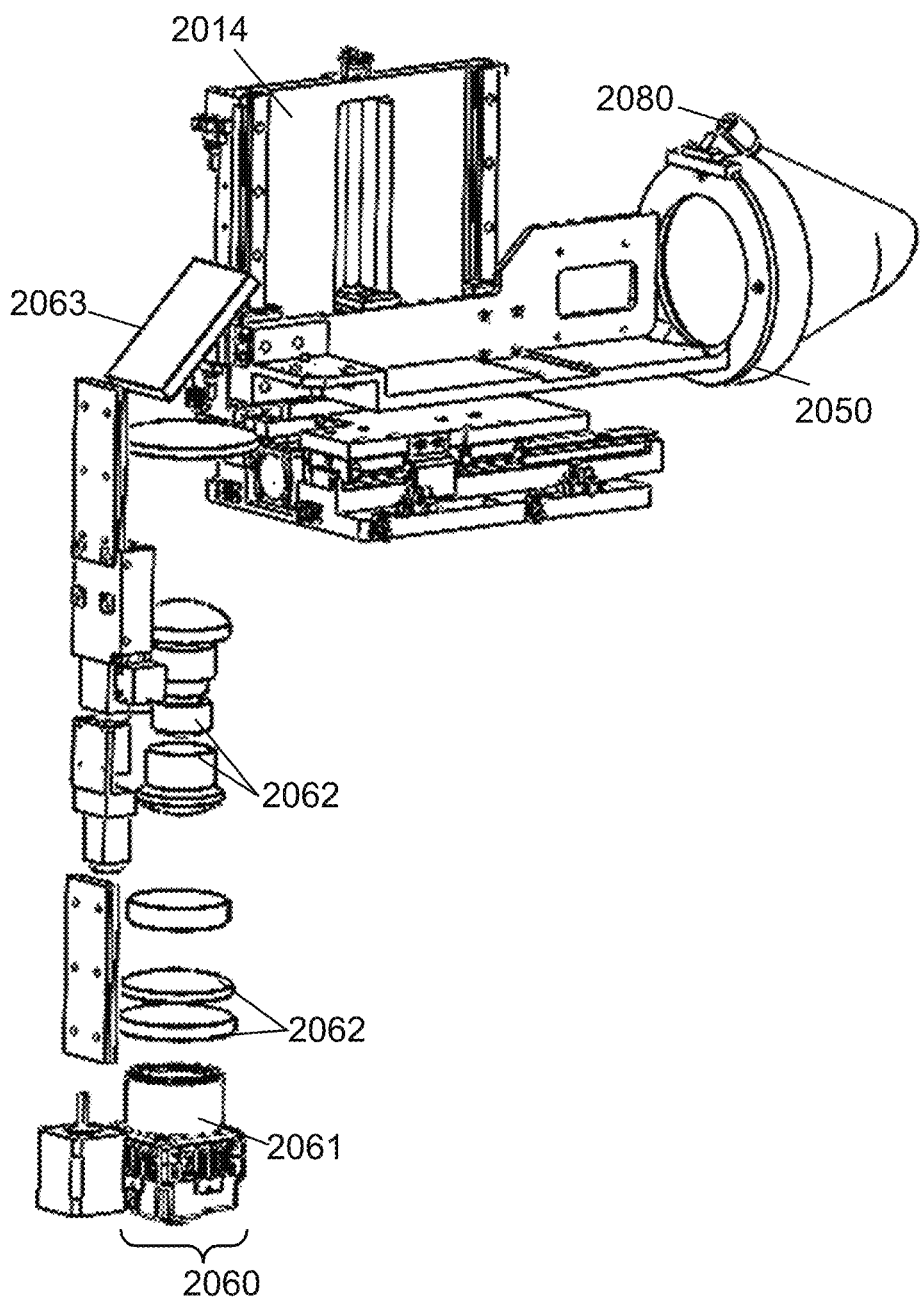
FIG. 2I is a 3D diagram of an optical acquisition sub-system, a second illumination device and a cleaner of the system, according to some embodiments of the invention.

Reference is also made to FIG. 2I, which is a 3D diagram of an optical acquisition sub-system 2060 of system 2000, a second illumination device 2050 and a cleaner 2080, according to some embodiments of the invention.

The components shown in FIGS. 2B-2I may be disposed within housing 2005 of system 2000, wherein at least a portion of the components may be disposed in compartments 2006, 2007 of housing 2005.

System 2000 may include a frame 2008 (e.g., such as frame 1008 described hereinabove). Frame 2008 may support components of system 2000. Each of compartments 2006, 2007 may accommodate a jet blade support assembly 2010 (e.g., such as jet blade support assembly 1010 described hereinabove). Jet blade support assembly 2010 may include a sub-frame 2012 (e.g., such as sub-frame 1012 described hereinabove). Sub-frame 2012 may be coupled to frame 2008. Sub-frame 2012 may be movable with respect to frame 2008 in directions that are parallel to a first axis 2008a, e.g. to extract and retract jet blade support assembly 2010 from and to respective compartment 2006, 2007. Jet blade support assembly 2010 may include a cover 2011 (e.g., such as cover 1011 described hereinabove), a gripper support 2020 (e.g., such as gripper support 1020 described hereinabove) and a plurality of jet blade grippers 2030 (e.g., each such as jet blade gripper 1030 described hereinabove). Gripper support 2020 may be rotatably coupled to sub-frame 2012 of jet blade support assembly 2010 and may be tiltable about a tilting axis 2021, for example by an actuator 2021a (e.g., as shown in FIGS. 2D-2E). Each of gripper supports 2020 may couple, or removably couple, the plurality of jet blade grippers 2030. Coupling the plurality of jet blade grippers 2030 to gripper support 2020 may allow inspection of the plurality of jet blade grippers 2030 in a single inspection cycle of system 2000. Each of jet blade grippers 2030 may be rotatable (e.g., by its respective actuator 2031a) about its respective gripper rotation axis 2031. FIGS. 2D and 2E show gripper support 2020 and jet blade grippers 2030 coupled thereto at different tilting positions.

A third illumination device 2070 (e.g. such as third illumination device 1070 described hereinabove) may be coupled to sub-frame 2012 or cover 2011 of jet blade support assembly 2010.

A plurality of first illumination device 2024 (each such as first illumination device 1040 described hereinabove) may be coupled to gripper support 2020 of each jet blade support assembly 2010 (not shown in FIGS. 2B and 2C for simplicity). Each of first illumination devices 2040 may illuminate at least root 91 of jet blade 90 at least partially through the interior of jet blade gripper 2030. Each first illumination device 2040 may include a plurality of light emitting elements 2041 (e.g., such as light emitting elements 1041 described hereinabove) arranged along a perimeter or circumference of respective jet blade gripper 2030, e.g. as shown in FIGS. 2G and 2H. Light emitting elements 2041 of each first illumination device 2040 may be turned on simultaneously to illuminate at least root 91 of jet blade 90 from a plurality of directions. Alternatively, subsets of light emitting elements 2041 of each first illumination device 2040 may be turned on while other light emitting elements 2041 may be turned off to illuminate at least root 91 of jet blade from one direction (e.g., as shown in FIG. 2H) or selected directions (e.g., as shown in FIG. 2G). Each of jet blade grippers 2030 may guide light 80 emitted by respective first illumination device 2040 (e.g., as described hereinbelow) towards at least root 91 of jet blade 90 at least partially through the interior of jet blade gripper 2030. Each of jet blade grippers 2030 may guide light 80 in a direction that is substantially parallel to gripper rotation axis 2031 and longitudinal axis 92 of jet blade 90 (e.g., as shown in FIGS. 2G and 2H), for example at an angle of 0 to 30 degrees relative to gripper rotation axis 2031 and longitudinal axis 92 of jet blade 90. Each of jet blade grippers 2030 may include a visual marker 2032 (e.g., as shown in FIG. 2F). Representation of visual marker 2032 in images of jet blade gripper 2030 and jet blade 90 may be used for registration of the images and various determinations related to het blades 90 (e.g., as described above with respect to FIGS. 1C-1E).

In the example of FIGS. 2B and 2C, system 2000 includes an optical acquisition sub-system 2060 (e.g., such as optical acquisition sub-system 1060 described hereinabove) which may be coupled to frame 2008 (e.g., using a sub-frame 2013, such as sub-frame 1013 described hereinabove). Sub-frame 2013 and optical acquisition sub-system 2060 coupled thereto may be movable (e.g., by an actuator 2013a shown in FIG. 2C) with respect to frame 2008 in directions that are parallel to a second axis 2008b. Second axis 2008b may be parallel (or substantially parallel) to titling axis 2021 and perpendicular (or substantially perpendicular) to first axis 2008a. A second illumination device 2050 (e.g., such as second illumination device 1050 described hereinabove) may be coupled to optical acquisition sub-system 2060 (e.g., as described hereinabove with respect to FIGS. 1C-1E). A cleaner 2080 (e.g., such as cleaner 1080 described hereinabove) may be coupled to second illumination device 2050.

In operation, optical acquisition sub-system 2060 may be disposed within first compartment 2006 and perform optical inspection of a batch of jet blades 90 disposed within first compartment 2006 under control of a computing device 2200 (e.g., such as computing device 1200 described hereinabove), for example as described above with respect to FIGS. 1C-1E. At the same time, a technician may prepare a second batch of jet blades 90 for optical inspection and assemble them into second compartment 2022. When the inspection of jet blades 90 in first compartment 2006 is completed, computing device 2200 may cause optical acquisition sub-system 2060 and second illumination device 2050 coupled thereto to move from first compartment 2006 into second compartment 2007 and perform inspection of the second batch of jet blades 90 disposed within second compartment 2007. At this time, the technician may disassemble the first batch of jet blades 90 from first compartment 2007, prepare and assemble a new batch of jet blades 90 into first compartment 2006. Such configuration of system 2000 may allow having single optical acquisition sub-system 2060 and single second illumination device 2050 in system 2000. However, other configurations of system 2000 may be used. For example, system 2000 may have optical acquisition sub-system 2060, second illumination device 2050 and other suitable components in each of compartments 2006, 2007.

Optical acquisition sub-system 2060 may include an imaging sensor 2061 (e.g., such as imaging sensor 1061 described hereinabove) and a plurality of optical elements 2062 (e.g., such as optical elements 1062 described hereinabove). Optical acquisition sub-system 2060 may be movable with respect to sub-frame 2013 (and thus with respect to frame 2008) in directions that are parallel to a third axis 2008c. Third axis 2008c may be parallel (or substantially parallel) to gripper rotation axis 2031 axis 2021 and perpendicular (or substantially perpendicular) to first axis 2008a and second axis 2008b. Mirrors, such as mirror 2063 shown in FIGS. 2B and 2I, may be used to redirect light reflected from jet blade 90 towards imaging sensor 2061. This may allow positioning components of optical acquisition sub-system 2060 in different planes (e.g., as shown in FIGS. 2B, 2C and 2H) if required by design system 2000.

Figure 3B:
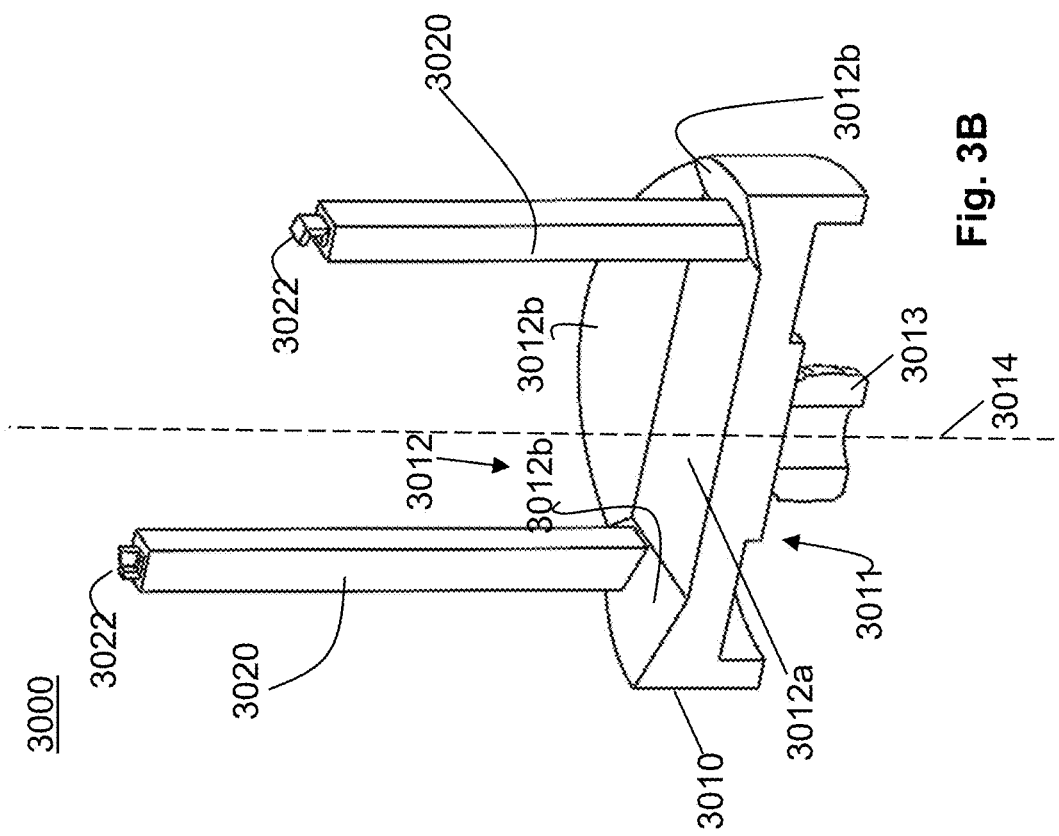
FIG. 3B is a partial sectional view of the jet blade gripper of FIG. 3A, according to some embodiments of the invention.
Figure 3A:
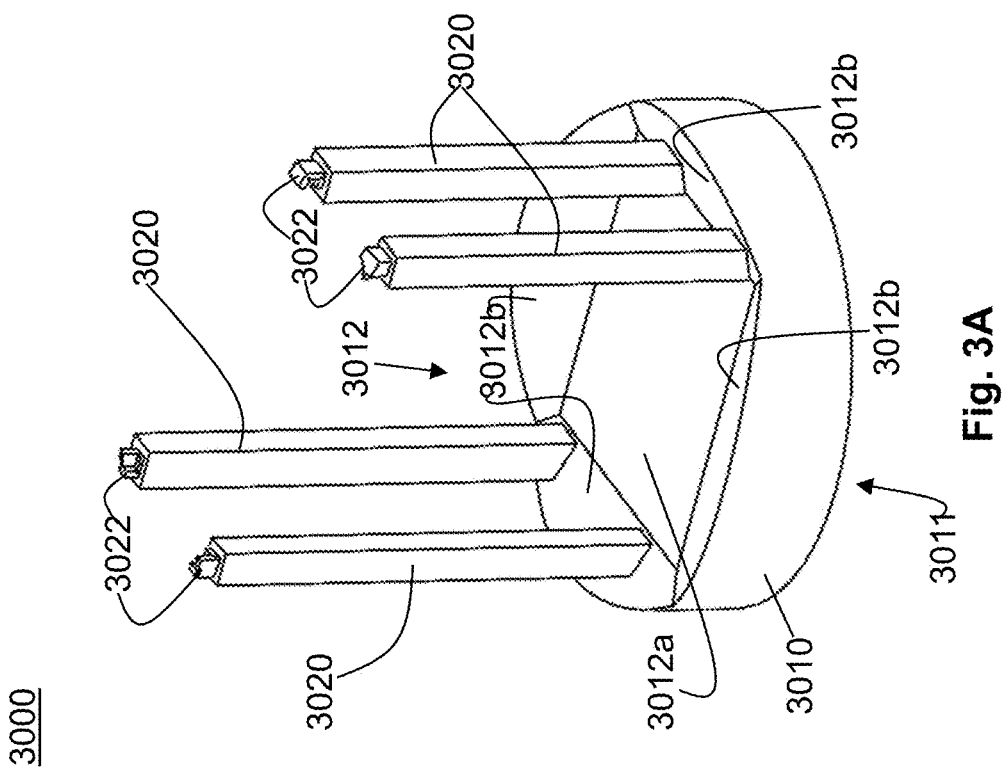
FIG. 3A is a 3D diagram of a jet blade gripper, according to some embodiments of the invention.

Reference is made to FIG. 3A, which is a 3D diagram of a jet blade gripper 3000, according to some embodiments of the invention.

Reference is also made to FIG. 3B, which is a partial sectional view of jet blade gripper 3000 of FIG. 3A, according to some embodiments of the invention.

Figure 3C:
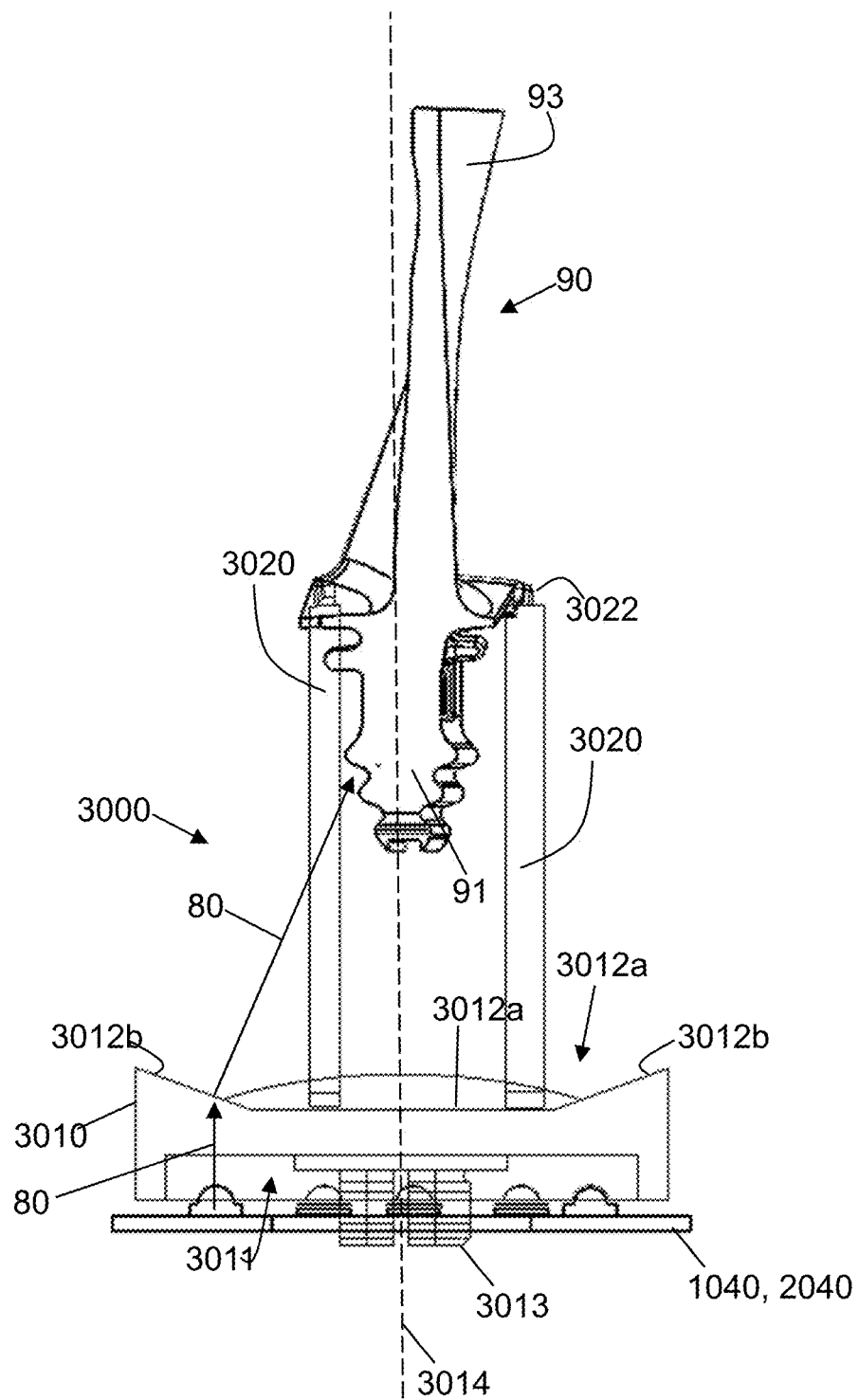
FIG. 3C is a partial sectional view of the jet blade gripper of FIG. 3A holding the jet blade, according to some embodiments of the invention.

Reference is also made to FIG. 3C, which is a partial sectional view of jet blade gripper 3000 of FIG. 3A, holding jet blade 90, according to some embodiments of the invention.

Reference is also made to FIG. 3D, which is a 3D diagram of jet blade gripper 3000 holding jet blade 90, wherein jet blade 90 may include one or more ducts 94, 94a, according to some embodiments of the invention. One or more ducts 94, 94a may extend through root 91 and foil 93 of jet blade 90.

Reference is also made to FIG. 3E, which is a partial sectional view of jet blade gripper 3000 of FIG. 3D, holding jet blade 90, according to some embodiments of the invention.

Jet blade gripper 3000 (e.g., such as jet blade gripper 1030 and 2030 described hereinabove) may include a base member 3010. Base member 3010 may be formed from a material that is at least partially transmissive to light. For example, the material may be at least partly transmissive to light in wavelength range of 200 to 1,000 nm. For example, base member 3010 may be formed of an optical polycarbonate, an optical polymethyl methacrylate and/or any other suitable material that is at least partially transmissive to light. Base member 3010 may be or may include a collimating lens (e.g., ensures that rays of light 80 travel parallel to each other). In the example of FIGS. 3A and 3B, base member 3010 has a circular (or substantially circular) shape.

Base member 3010 may have a bottom surface 3011 and a top surface 3012 opposing to bottom surface 3011. When coupled to a gripper support in a jet blade support assembly (e.g., such as gripper support 1020, 2020 in jet blade assemblies 1010, 2010 described hereinabove, respectively), bottom surface 3011 may face the gripper support.

Base member 3010 may include a connector 3013 projecting from bottom surface 3011 of base member 3010. Connector 3013 may removably and securely couple base member 3010 of jet blade gripper 3000 to the gripper support and/or to an actuator (e.g., such as actuator 1031a, 2031a described hereinabove) for rotating jet blade gripper 3000 about a gripper rotation axis 3014 (e.g., such as gripper rotation axis 1031, 2031 described hereinabove).

Top surface 3012 of base member 3010 may be concave (or substantially concave). Top surface 3012 may include a central portion 3012a. In the example of FIGS. 3A-3C, central portion 3012a of top surface 3012 is flat (or substantially flat). In the example of FIGS. 3D-3E, central portion 3012a of top surface 3012 includes a convex sub-portion 3012aa.

Top surface 3012 may include a sloped portion 3012b. Sloped portion 3012b may surround central portion 3012a. Sloped portion 3012b may converge from an edge 3012c of top surface 3012 towards central portion 3012a of top surface 3012. Sloped portion 3012b of top surface 3012 may include a plurality of sub-portions. In the example of FIGS. 3A-3C, sloped portion 3012b of top surface 3012 includes four sub-portions. In one example, all the sub-portions of sloped portion 3012b have the same slope. In another example, a pairs of opposing sub-portions of sloped portion 3012b may have a slope that is different from a slope of another pair of opposing sub-portions of sloped portion 3012b. In another example, each of the sub-portions of sloped portion 3012b may have a different slope.

Jet blade gripper 3000 may include a plurality of elongated members 3020 projecting from top surface 3012 of base member 3010. In the example of FIG. 3A, jet blade gripper 3000 includes four elongated members 3020. Base member 3010 and elongated members 3020 may be formed from one piece of material. Each of elongated members 3020 may include, at its free end, a latch 3022. Latches 3022 may hold root 91 of jet blade 90 when jet blade 90 is coupled to jet blade gripper 300.

Dimensions of base member 3010, the slope of sloped portion 3012b of top surface 3012 of base member 3010 or slopes of the sub-portions of sloped portion 3012b, and the height of each of elongated members 3020 relative to top surface 3012 of base member 3010 may be determined for each particular type of jet blade 90, e.g. based on the geometry of jet blade 90.

In operation, base member 3010 of jet blade gripper 3000 may guide light 80, for example emitted by first illumination device 1040, 2040 as described hereinabove, towards at least root 91 of jet blade 90 at least partially through the interior of base member 3010. For example, light 80 may enter into the interior of base member 3010 of jet blade gripper 3000 from its bottom surface 3011, propagate through the interior of base member 3010 and exit from top surface 3012 of base member 3010, e.g., from sloped portion 3012b (e.g. as shown in FIG. 3C) and/or central surface 3012a (e.g. as shown in FIG. 3E) of base member 3010 towards at least root 91 of jet blade 90 held by latches 3020 of elongated members 3020 of jet blade gripper 300. Sloped portion 3012b may guide light 80 to at least root 91 of jet blade 90 in a direction that is parallel (or substantially parallel) to gripper rotation axis 3014 (e.g., at an angle ranging between 0 and 30 degrees relative to gripper rotation axis 3014).

Guiding light 80 through central portion 3012a of top surface 3012 of base member 3010 of jet blade gripper 300, e.g. as in the example of FIGS. 3D-3E) may allow delivering light into one or more ducts 94, 94a of jet blade 90. Light 80 may enter one or more ducts 94 on root 91 of jet blade and exit from one or more ducts 93a on foil 93 of jet blade 90. Illuminating one or more ducts 94, 94a of jet blade 90 may enhance the inspection of one or more ducts 94, 94a by inspection system 100, 200 as described hereinabove. The inspection of one or more ducts 94, 94a may ensure that one or more ducts 94, 94a are not blocked. For example, difference in the intensity of light 80 entering and exiting one or more ducts 94, 94a that is above a threshold may be indicative of blockage of one or more ducts 94, 94a.

Figure 4:
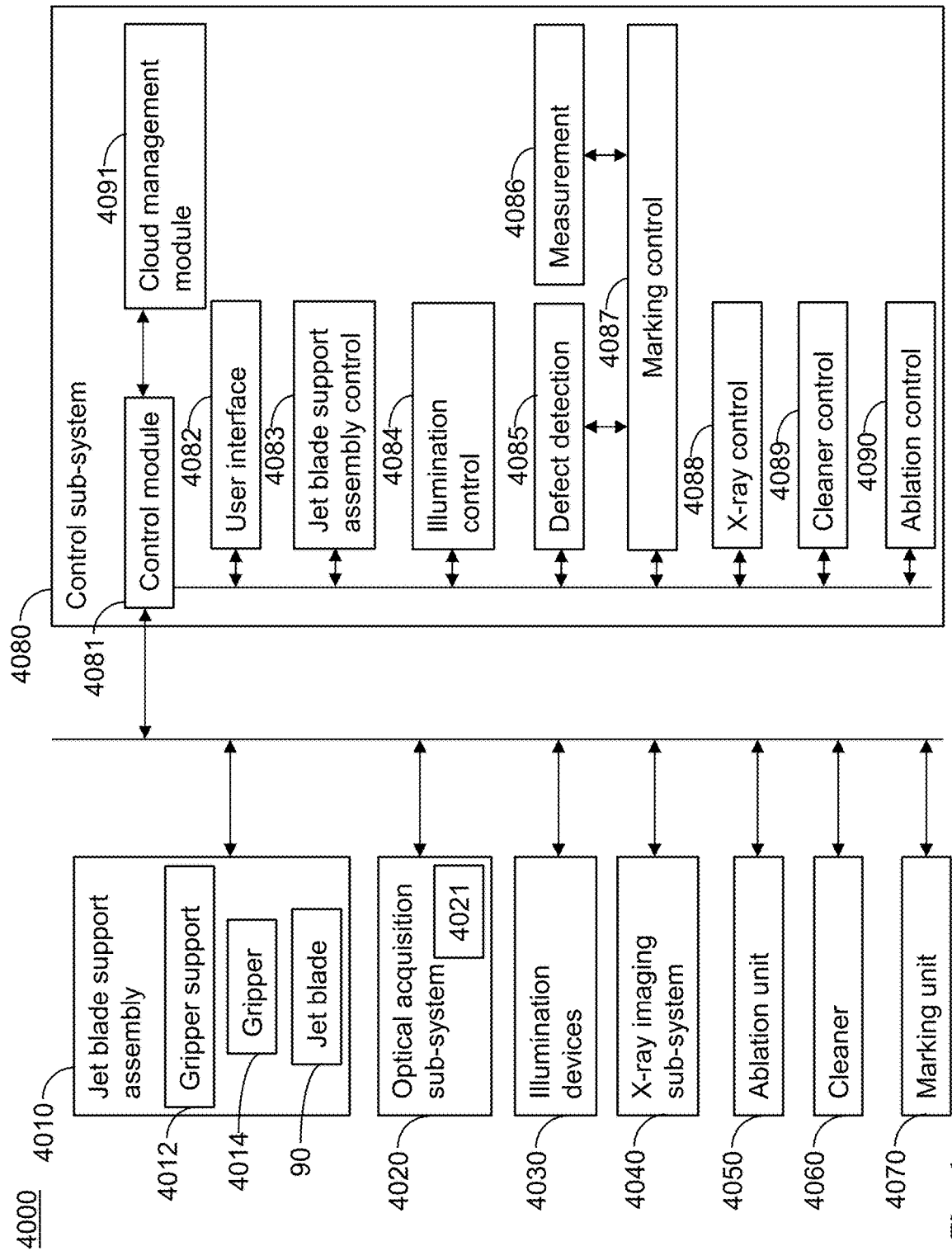
FIG. 4 is a block diagram of a system for inspecting the jet blade, according to some embodiments of the invention.

Reference is made to FIG. 4, which is a block diagram of a system 4000 for inspecting jet blade 90, according to some embodiments of the invention.

System 4000 (e.g., "Aeroscanner" system), such as system 1000, 2000 described herein above, may include a jet blade support assembly 4010 (e.g., such as jet blade support assembly 1010, 2010 described hereinabove). Jet blade support assembly 4010 may support jet blade 90 during inspection of jet blade 90 by system 4000. Jet blade support assembly 4010 may include a gripper support 4012 (e.g., such as gripper support 1020, 2020 described hereinabove) and a jet blade gripper 4014 (e.g., such as het blade gripper 1030, 2030, 3000 described hereinabove).

System 4000 may include an optical acquisition sub-system 4020 (e.g., such as optical acquisition sub-system 1060, 2060 described hereinabove). Optical acquisition sub-system 4020 may acquire images (e.g., optical and/or x-ray images) of jet blade 90 during inspection thereof while ensuring that the images acquired by optical acquisition sub-system 4020 have the desired image parameters (e.g., as described hereinabove). Optical acquisition sub-system 4020 may include a controller 4021 that may adjust the parameters of optical acquisition sub-system 4020 based on received parameters (e.g., based on the digital twin) of jet blade 90 and/or based on one or more images of jet blade acquired by optical acquisition sub-system 4020, e.g. to ensure that the acquired images have the desired image parameters (e.g., such as a desired field of view, magnification, focus and/or any other image parameters (e.g., as described hereinabove).

System 4000 may include illumination devices 4030. Illumination devices 4030 may include a first illumination device (e.g., such as first illumination device 1040, 2040 described hereinabove), a second illumination device (e.g., such as second illumination device 1050, 2050 described hereinabove) and/or a third illumination device (e.g., such as third illumination device 1070, 2070 described hereinabove). The first illumination device may illuminate at least the root of jet blade 90 at least partially through the interior of light-transmissive jet blade gripper 4014 (described hereinabove). The second illumination device may illuminate jet blade 90 from a direction that is perpendicular to an illumination direction of the first illumination device (e.g., as described hereinabove). The third illumination device may provide backlight illumination of jet blade 90 (e.g., as described hereinabove).

System 4000 may include an x-ray imaging sub-system 4040. X-ray imaging sub-system 4040 may include an x-ray source (e.g., such as x-ray source 1100 described hereinabove) and a scintillator (e.g., such as scintillator 1101 described hereinabove). X-ray imaging sub-system 4040 may be disposed in a dedicated compartment which may include lead and/or any other x-ray attenuating or absorbing material (e.g., as described hereinabove).

System 4000 may include an ablation unit 4050 (e.g., such as ablation unit 1090 described hereinabove). Ablation unit 4050 may remove (e.g., ablate) material residuals (e.g., protrusions) from the surface of jet blade 90 (e.g., using a laser).

System 4000 may include a cleaner 4060 (e.g., such as cleaner 1080 described hereinabove). Cleaner 4060 may clean the surface of jet blade 90, for example by applying or puffing air towards jet blade 90 (e.g., as described hereinabove). For example, cleaner 4060 may remove dust or other machining residuals from the surface of jet blade 90.

System 4000 may include a marking unit 4070. Marking unit 4070 may mark jet blade 90 during inspection of jet blade 90. For example, marking unit 4070 may mark jet blade 90 if a defect in jet blade 90 is detected and/or if dimensions of jet blade 90 are not within permitted dimensions range.

System 4000 may include a control sub-system 4080 (e.g., such as computing device 1200, 2200 described hereinabove). Control sub-system 4080 may include a control module 4081. Control module 4081 may control (e.g., orchestrate) the operation of components of system 4000 directly or via respective control modules described herein.

Control sub-system 4080 may include a user interface 4082. Using user interface 4082, the technician of system 4000 may control operation of system 4000, provide data as an input to system 4000 and/or receive an output and/or notifications from system 4000.

Control sub-system 4080 may include a jet blade support assembly control module 4083. Control module 4083 may control jet blade support assembly 4010 (e.g., as described hereinabove). For example, control module 4083 may control extraction and retraction of jet blade support assembly 4010 from and into compartment of a housing of system 4000. Control module 4083 may control tilting of gripper support 4012 and/or rotation of jet blade gripper 4014 (e.g., as described hereinabove).

Control sub-system 4080 may include an illumination control module 4084. Illumination control module 4084 may control illumination devices 4030 to illuminate jet blade 90 under different illumination conditions during inspection thereof (e.g., as described hereinabove).

Control sub-system 4080 may include a defect detection module 4085. Defect detection module 4085 may detect defects in jet blade 90 based on the images of jet blade 90 acquired by optical acquisition sub-system 4020.

Control sub-system 4080 may include a measurement module 4086. Measurement detection module 4086 may determine dimensions of jet blade 90 based on the images of jet blade 90 acquired by optical acquisition sub-system 4020.

Control sub-system 4080 may include a marking control module 4087. Marking control module 4087 may control marking unit 4070 to mark jet blade 90, for example if defects are detected by defect detection module 4085 and/or if dimensions of jet blade 90 determined by measurement module 4086 are not within permitted range.

Control sub-system 4080 may include an x-ray control module 4088. X-ray control module 4088 may control x-ray imaging sub-system 4040 (e.g., as described hereinabove).

Control sub-system 4080 may include a cleaner control module 4089 to control cleaner 4060 (e.g., as described hereinabove).

Control sub-system 4080 may include an ablation control module 4090 to control ablation unit 4050 (e.g., as described hereinabove).

Control sub-system 4080 may include a cloud management module 4091 to upload and/or download data to and from a cloud.

Figure 5:
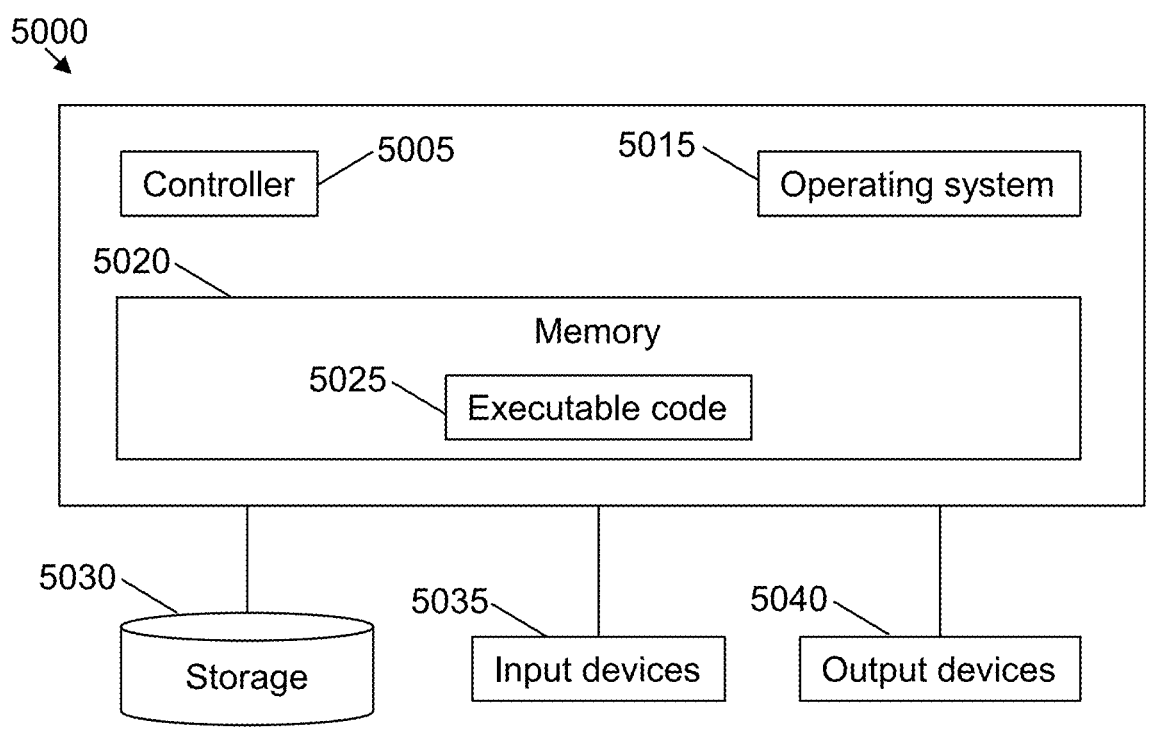
FIG. 5 is a block diagram of an exemplary computing device which may be used with embodiments of the present invention.

Reference is now made to FIG. 5, which is a block diagram of an exemplary computing device which may be used with embodiments of the present invention.

Computing device 5000 may include a controller or processor 5005 that may be, for example, a central processing unit processor (CPU), graphical processing unit (GPU), a chip or any suitable computing or computational device, an operating system 5015, a memory 5020, a storage 5030, input devices 5035 and output devices 5040.

Operating system 5015 may be or may include any code segment designed and/or configured to perform tasks involving coordination, scheduling, arbitration, supervising, controlling or otherwise managing operation of computing device 5000, for example, scheduling execution of programs. Memory 5020 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 5020 may be or may include a plurality of, possibly different, memory units. Memory 5020 may store for example, instructions to carry out a method (e.g., code 5025), and/or data such as user responses, interruptions, etc.

Executable code 5025 may be any executable code, e.g., an application, a program, a process, task or script. Executable code 5025 may be executed by controller 5005 possibly under control of operating system 5015. In some embodiments, more than one computing device 5000 or components of device 5000 may be used for multiple functions described herein. For the various modules and functions described herein, one or more computing devices 5000 or components of computing device 5000 may be used. Devices that include components similar or different to those included in computing device 5000 may be used, and may be connected to a network and used as a system. One or more processor(s) 5005 may be configured to carry out embodiments of the present invention by for example executing software or code. Storage 5030 may be or may include, for example, a hard disk drive (e.g. SSD), a Compact Disk (CD) drive, a CD-Recordable (CD-R) drive, a universal serial bus (USB) device or other suitable removable and/or fixed storage unit. In some embodiments, some of the components shown in FIG. 5 may be omitted.

Input devices 5035 may be or may include a mouse, a keyboard, a touch screen or pad or any suitable input device. It will be recognized that any suitable number of input devices may be operatively connected to computing device 5000 as shown by block 5035. Output devices 5040 may include one or more displays (e.g., touch LCD display), speakers and/or any other suitable output devices. It will be recognized that any suitable number of output devices may be operatively connected to computing device 5000 as shown by block 5040. Any applicable input/output (I/O) devices may be connected to computing device 5000, for example, a wired or wireless network interface card (NIC), a modem, printer or facsimile machine, a universal serial bus (USB) device or external hard drive may be included in input devices 5035 and/or output devices 5040.

Embodiments of the invention may include one or more article(s) (e.g., memory 5020 or storage 5030) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the present invention may improve inspection of jet blades, such as jet blades used in aero-engines. Controlled tilting of the gripper support, controlled rotation of the light-transmissive jet blade grippers and controlled illumination of the jet blades by the first illumination device and the second illumination device from different directions, as well as backlight illumination and optionally x-ray imaging, may allow the optical acquisition sub-system to capture a plurality of images covering the entire (or substantially entire) surface of the jet blades, including the surfaces of the roots of the jet blades, from different directions and/or under different illumination conditions. Based on at least a portion of the images, the computing device may determine the existence or absence of defects in the jet blades.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A jet blade support assembly for a jet blade optical inspection system, the jet blade support assembly comprising:
    a sub-frame;
    a gripper support rotatably coupled to the sub-frame, the gripper support being tiltable with respect to the sub-frame about a tilting axis; and
    a jet blade gripper to hold a root of a jet blade, the jet blade gripper being formed from a material that is at least partially transmissive to light, the jet blade gripper being coupled to the gripper support and being rotatable with respect to the gripper support about a gripper rotation axis that is perpendicular to the tilting axis.

2. The jet blade support assembly of claim 1, wherein the jet blade gripper is removably couplable to the gripper support.

3. The jet blade support assembly of claim 1, comprising an illumination device to illuminate at least the root of the jet blade at least partially through the jet blade gripper.

4. The jet blade support assembly of claim 3, wherein the illumination device is coupled to the gripper support, the illumination device being disposed between the gripper support and the jet blade gripper.

5. The jet blade support assembly of claim 3, wherein the illumination device comprises a plurality of light emitting elements coupled to the gripper support and arranged along a curve corresponding to a perimeter of a bottom surface of the jet blade gripper.

6. The jet blade support assembly of claim 5, wherein each light emitting element of the plurality of light emitting elements of the illumination device is operable independent of other light emitting elements of the plurality of light emitting elements.

7. The jet blade support assembly of claim 1, comprising a weight sensor coupled to the gripper support, the weight sensor to measure a weight of the jet blade gripper and the jet blade affixed therein.

8. The jet blade support assembly of claim 1, wherein the jet blade gripper comprises:
   a base member, and
   a plurality of elongated members projecting from a top surface of the base member, each of the elongated members comprises a latch to hold the root of the jet blade.

9. An optical acquisition system for a jet blade optical inspection system, the optical acquisition system comprising:
   a sub-frame;
   a plurality of movable lenses coupled to the sub-frame;
   an imaging sensor coupled to the sub-frame; and
   a controller to, based on at least one of geometric parameters of a jet blade and one or more images of the jet blade acquired by the imaging sensor, control relative position of at least a portion of the movable lenses with respect to each other.

10. The optical acquisition system of claim 9, wherein the sub-frame is movably couplable to a frame of the jet blade optical inspection system.

11. The optical acquisition system of claim 10, wherein the sub-frame is movable with respect to the frame of the jet blade optical inspection system along at least one of:
   a first axis to adjust a distance between the optical acquisition system and the jet blade in the jet blade optical inspection system,
   a second axis that is perpendicular to the first axis and parallel to a longitudinal axis of the jet blade, and
   a third axis that is perpendicular to the first axis and the second axis.

12. The optical acquisition system of claim 9, comprising an illumination device to illuminate at least a portion of the jet blade.

13. The optical acquisition system of claim 12, wherein the illumination device comprises a plurality of light emitting elements arranged in a ring, the illumination device being coaxial with an optical axis of the optical acquisition system.

14. A jet blade gripper for a jet blade optical inspection system, the jet blade gripper comprising:
   a base member, the base member being formed from a material that is at least partially transmissive to light; and
   a plurality of elongated members projecting from a top surface of the base member, each of the elongated members comprises a latch to hold a root of a jet blade.

15. The jet blade gripper of claim 14, wherein the base member is a collimating lens causing rays of light passing therethrough to travel parallel to each other.

16. The jet blade gripper of claim 14, wherein the top surface of the base member comprises:
   a central portion; and
   a sloped portion surrounding the central portion, the sloped portion converging from an edge of the top surface towards the central portion.

17. The jet blade gripper of claim 16, wherein the central portion of the top surface of the base member is flat.

18. The jet blade gripper of claim 16, wherein at least a portion of the central portion of the top surface of the base member is curved outwardly.

19. The jet blade gripper of claim 14, wherein the base member and the elongated members are formed from one piece of material.

20. The jet blade gripper of claim 14, wherein the base member comprises a connector projecting from a bottom surface that is opposite to the top surface, the connector is to securely couple the base member within the jet blade optical inspection system.

* * * * *